(12) United States Patent
Sasaki

(10) Patent No.: US 8,452,092 B2
(45) Date of Patent: May 28, 2013

(54) IMAGE PROCESSING DEVICE, ENDOSCOPE SYSTEM, PROGRAM, AND IMAGE PROCESSING METHOD

(75) Inventor: Hiroshi Sasaki, Hachioji (JP)

(73) Assignee: Olympus Corporation, Tokyo (JP)

( * ) Notice: Subject to any disclaimer, the term of this patent is extended or adjusted under 35 U.S.C. 154(b) by 224 days.

(21) Appl. No.: 13/006,851

(22) Filed: Jan. 14, 2011

(65) Prior Publication Data

US 2011/0176730 A1  Jul. 21, 2011

(30) Foreign Application Priority Data

Jan. 15, 2010  (JP) ................................. 2010-006859

(51) Int. Cl.
*G06T 5/40* (2006.01)

(52) U.S. Cl.
USPC ............................ 382/167; 382/162; 382/168

(58) Field of Classification Search
USPC ................. 382/162, 167, 168, 100, 232, 261, 382/268; 380/54; 348/254, 315, 319, E3.025, 348/222.1
See application file for complete search history.

(56) References Cited

U.S. PATENT DOCUMENTS

| 4,574,311 | A | * | 3/1986 | Resnikoff et al. | ............. | 348/315 |
| 7,889,250 | B2 | * | 2/2011 | Aragaki | ........................ | 348/254 |

FOREIGN PATENT DOCUMENTS

| JP | 08-237672 | 9/1996 |
| JP | 2006-068113 | 3/2006 |
| JP | 2009-044594 | 2/2009 |

* cited by examiner

*Primary Examiner* — Anh Do
(74) *Attorney, Agent, or Firm* — Scully, Scott, Murphy & Presser, P.C.

(57) ABSTRACT

An image processing device includes a demosaicing section that receives an image that includes a first color signal, a second color signal, and a third color signal, and performs an interpolation process that interpolates a missing color signal among the first color signal, the second color signal, and the third color signal on each pixel of the image, and an image output section that outputs an output image based on an image obtained by the interpolation process and output from the demosaicing section. The demosaicing section performs a space-variant interpolation process that implements a different interpolation process depending on a pixel position on a first image that has information within a first wavelength band. The demosaicing section performs a space-invariant interpolation process that implements an interpolation process independently of a pixel position on a second image that has information within a second wavelength band.

17 Claims, 24 Drawing Sheets

FIG. 16A

| X-Gv (k-2,l-2) | | X-Gv (k,l-2) | | X-Gv (k+2,l-2) |
|---|---|---|---|---|
| | X-Gv (k-1,l-1) | | X-Gv (k+1,l-1) | |
| X-Gv (k-2,l) | | X-Gv (k,l) | | X-Gv (k+2,l) |
| | X-Gv (k-1,l+1) | | X-Gv (k+1,l+1) | |
| X-Gv (k-2,l+2) | | X-Gv (k,l+2) | | X-Gv (k+2,l+2) |

FIG. 16B

| X-Gh (k-2,l-2) | | X-Gh (k,l-2) | | X-Gh (k+2,l-2) |
|---|---|---|---|---|
| | X-Gh (k-1,l-1) | | X-Gh (k+1,l-1) | |
| X-Gh (k-2,l) | | X-Gh (k,l) | | X-Gh (k+2,l) |
| | X-Gh (k-1,l+1) | | X-Gh (k+1,l+1) | |
| X-Gh (k-2,l+2) | | X-Gh (k,l+2) | | X-Gh (k+2,l+2) |

FIG. 16C WHITE LIGHT

| XL-Ga (k-2,l-2) | | XL-Ga (k,l-2) | | XL-Ga (k+2,l-2) |
|---|---|---|---|---|
| | XL-Ga (k-1,l-1) | | XL-Ga (k+1,l-1) | |
| XL-Ga (k-2,l) | | XL-Ga (k,l) | | XL-Ga (k+2,l) |
| | XL-Ga (k-1,l+1) | | XL-Ga (k+1,l+1) | |
| XL-Ga (k-2,l+2) | | XL-Ga (k,l+2) | | XL-Ga (k+2,l+2) |

FIG. 16D SPECIAL LIGHT

| X-Ga (k-2,l-2) | | X-Ga (k,l-2) | | X-Ga (k+2,l-2) |
|---|---|---|---|---|
| | X-Ga (k-1,l-1) | | X-Ga (k+1,l-1) | |
| X-Ga (k-2,l) | | X-Ga (k,l) | | X-Ga (k+2,l) |
| | X-Ga (k-1,l+1) | | X-Ga (k+1,l+1) | |
| X-Ga (k-2,l+2) | | X-Ga (k,l+2) | | X-Ga (k+2,l+2) |

IMAGE PROCESSING DEVICE, ENDOSCOPE SYSTEM, PROGRAM, AND IMAGE PROCESSING METHOD

Japanese Patent Application No. 2010-006859 filed on Jan. 15, 2010, is hereby incorporated by reference in its entirety.

BACKGROUND

The present invention relates to an image processing device, an endoscope system, a program, an image processing method, and the like.

An imaging element (image sensor or image pickup element) that utilizes a Bayer array color filter is normally used when imaging (capturing or acquiring) a color image using a single imaging element. A demosaicing process that generates RGB color signals of each pixel (see JP-A-8-237672 and JP-A-2009-44594, for example) must be performed on an image obtained using a single imaging element. A false color due to the demosaicing process may be reduced by utilizing a color correlation (see JP-A-2009-44594, for example). An endoscope may apply narrow-band green (G) light and narrow-band blue (B) light (see JP-A-2006-68113, for example). According to this method, different blood vessel images are obtained by applying narrow-band green (G) light and narrow-band blue (B) light (i.e., the images have a low color correlation).

SUMMARY

According to one aspect of the invention, there is provided an image processing device comprising:

a demosaicing section that receives an image that includes a first color signal, a second color signal, and a third color signal, and performs an interpolation process that interpolates a missing color signal among the first color signal, the second color signal, and the third color signal on each pixel of the image; and an image output section that outputs an output image based on an image obtained by the interpolation process and output from the demosaicing section, the demosaicing section performing a space-variant interpolation process that implements a different interpolation process depending on a pixel position on a first image that has information within a first wavelength band, and the demosaicing section performing a space-invariant interpolation process that implements an interpolation process independently of a pixel position on a second image that has information within a second wavelength band.

According to another aspect of the invention, there is provided an endoscope system comprising:

a light source section that applies white light and light having a specific wavelength band to an in vivo object;

a demosaicing section that receives an image that includes a first color signal, a second color signal, and a third color signal, and performs an interpolation process that interpolates a missing color signal among the first color signal, the second color signal, and the third color signal on each pixel of the image;

an image output section that outputs an output image based on an image obtained by the interpolation process and output from the demosaicing section; and a display section that displays the output image output from the image output section, the demosaicing section performing a space-variant interpolation process that implements an interpolation process depending on a pixel position on a first image that has information within a wavelength band of the white light, and the demosaicing section performing a space-invariant interpolation process that implements an interpolation process independently of a pixel position on a second image that has information within the specific wavelength band.

According to another aspect of the invention, there is provided a program that is stored on an information recording medium, the program causing a computer to function as:

a demosaicing section that receives an image that includes a first color signal, a second color signal, and a third color signal, and performs an interpolation process that interpolates a missing color signal among the first color signal, the second color signal, and the third color signal on each pixel of the image; and an image output section that outputs an output image based on an image obtained by the interpolation process and output from the demosaicing section, the demosaicing section performing a space-variant interpolation process that implements an interpolation process depending on a pixel position on a first image that has information within a first wavelength band, and the demosaicing section performing a space-invariant interpolation process that implements an interpolation process independently of a pixel position on a second image that has information within a second wavelength band.

According to another aspect of the invention, there is provided an image processing method comprising:

performing an interpolation process on each pixel of an image that includes a first color signal, a second color signal, and a third color signal, the interpolation process interpolating a missing color signal among the first color signal, the second color signal, and the third color signal;

performing a space-variant interpolation process that implements an interpolation process depending on a pixel position on a first image that has information within a first wavelength band;

performing a space-invariant interpolation process that implements an interpolation process independently of a pixel position on a second image that has information within a second wavelength band; and outputting an output image based on an image obtained by the interpolation process.

BRIEF DESCRIPTION OF THE DRAWINGS

FIG. 10 shows an example of the spectral characteristics of a color filter that allows white light to pass through.

FIG. 11 shows an example of the spectral characteristics of a color filter that allows narrow-band light to pass through.

FIGS. 16A to 16D are views illustrative of a color difference similarity.

DESCRIPTION OF EXEMPLARY EMBODIMENTS

Several aspects of the invention may provide an image processing device, an endoscope system, a program, an image processing method, and the like that can switch over the demosaicing process.

According to one embodiment of the invention, there is provided an image processing device comprising:

a demosaicing section that receives an image that includes a first color signal, a second color signal, and a third color signal, and performs an interpolation process that interpolates a missing color signal among the first color signal, the second color signal, and the third color signal on each pixel of the image; and an image output section that outputs an output image based on an image obtained by the interpolation process and output from the demosaicing section, the demosaicing section performing a space-variant interpolation process that implements an interpolation process depending on a pixel position on a first image that has information within a first wavelength band, and the demosaicing section performing a space-invariant interpolation process that implements an interpolation process independently of a pixel position on a second image that has information within a second wavelength band.

According to the above embodiment, the space-variant interpolation process is performed on the first image that has information within the first wavelength band, and the space-invariant interpolation process is performed on the second image that has information within the second wavelength band. Therefore, the interpolation process can be switched over depending on the image, so that an appropriate interpolation process depending on the image can be performed. Exemplary embodiments of the invention are described below. Note that the following embodiments do not in any way limit the scope of the invention laid out in the claims. Note also that all elements of the following embodiments should not necessarily be taken as essential requirements for the invention.

1. Outline

An outline of one embodiment of the invention is described below. In this embodiment, the demosaicing process is switched over depending on the image in order to suppress an artifact (i.e., a pattern that is not actually present) due to the demosaicing process. A method according to this embodiment is described below with reference to FIGS. 1A to 4.

Figure 1A:
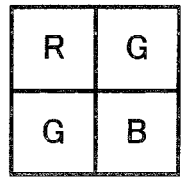
FIGS. 1A and 1B show color filter arrangement examples of a single imaging element.
Figure 1B:
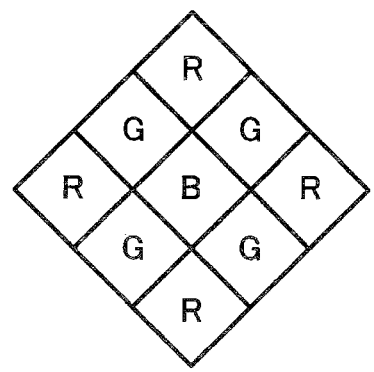

FIGS. 1A and 1B show color filter arrangement examples of a single imaging element. These arrangement examples correspond to a Bayer color filter array in which primary color filters are respectively disposed in pixels in a mosaic pattern. Specifically, G filters are disposed at two diagonal positions of a 2×2 pixel area, and an R filter and a B filter are disposed at the remaining positions. The 2×2 pixel areas (unit areas) are repeatedly arranged in the horizontal direction and the vertical direction.

A color signal (sampling signal) obtained using the single imaging element differs in spatial position. Specifically, the signal G and the signal R are color signals that differ in sampling density, and the signal G and the signal B are color signals that differ in sampling density. When reproducing a color image, it is necessary to perform a demosaicing process that generates three color signals per pixel from the image that includes one color signal per pixel.

The demosaicing process has a problem in that a false color occurs in an edge area including a high-frequency component due to the difference between the color signal sampling density and the phase. It is difficult to maintain the resolution while reducing a false color.

For example, the method disclosed in JP-A-8-237672 performs the interpolation process on each color signal without taking account of other color signals. According to this method, the signal generation interpolation position differs from the original sampling position so that each pixel is interpolated with identical frequency characteristics.

According to this method, however, a false color occurs due to the difference in color signal interpolation frequency characteristics in a region in a frequency band that is higher than half the Nyquist frequency of the imaging element. In order to suppress such a false color, it is necessary to limit the frequency band of the image obtained by the imaging element to a frequency that is lower than half the Nyquist frequency using an optical low-pass filter. Specifically, the resolution deteriorates as a result of suppressing a false color.

JP-A-2009-44594 discloses a method that solves the above problem, for example. According to this method, the demosaicing process is performed utilizing a color correlation (i.e., a correlation between color signals). Specifically, the signal G edge direction of the G signal-missing pixel is presumed based on the peripheral color difference similarity, and the interpolation process is performed corresponding to the presumed edge direction (adaptive direction determination interpolation).

JP-A-2006-68113 discloses a diagnosis method for an endoscope system that utilizes a white light image (normal light image) and a special light image. Specifically, white light (normal RGB light) is applied to tissues within a body cavity, and a white light image is acquired from the reflected light image. When performing a diagnosis using a special light image (NBI), narrow-band light G2 and narrow-band light B2 are sequentially applied, and a special light image is acquired from the reflected light image.

The narrow-band light G2 and the narrow-band light B2 differ in wavelength band from the components G and B of white light. Different in vivo images are obtained by the narrow-band light G2 and the narrow-band light B2 due to the absorption of hemoglobin in blood and the difference in attenuation in the depth direction of a tissue depending on the wavelength. An image of the capillaries and the mucosal integrity in the surface area is obtained by the narrow-band light B2, and an image of the thicker blood vessels in the deep area is obtained by the narrow-band light G2.

When applying the demosaicing process that utilizes the color correlation to the image obtained by the endoscope system, a high-resolution demosaicing process can be performed on the white light image since the white light image has a color correlation. On the other hand, since the special light image has a very low color correlation, an artifact may occur in the resulting image. This point is described below with reference to FIG. 2.

Figure 2:
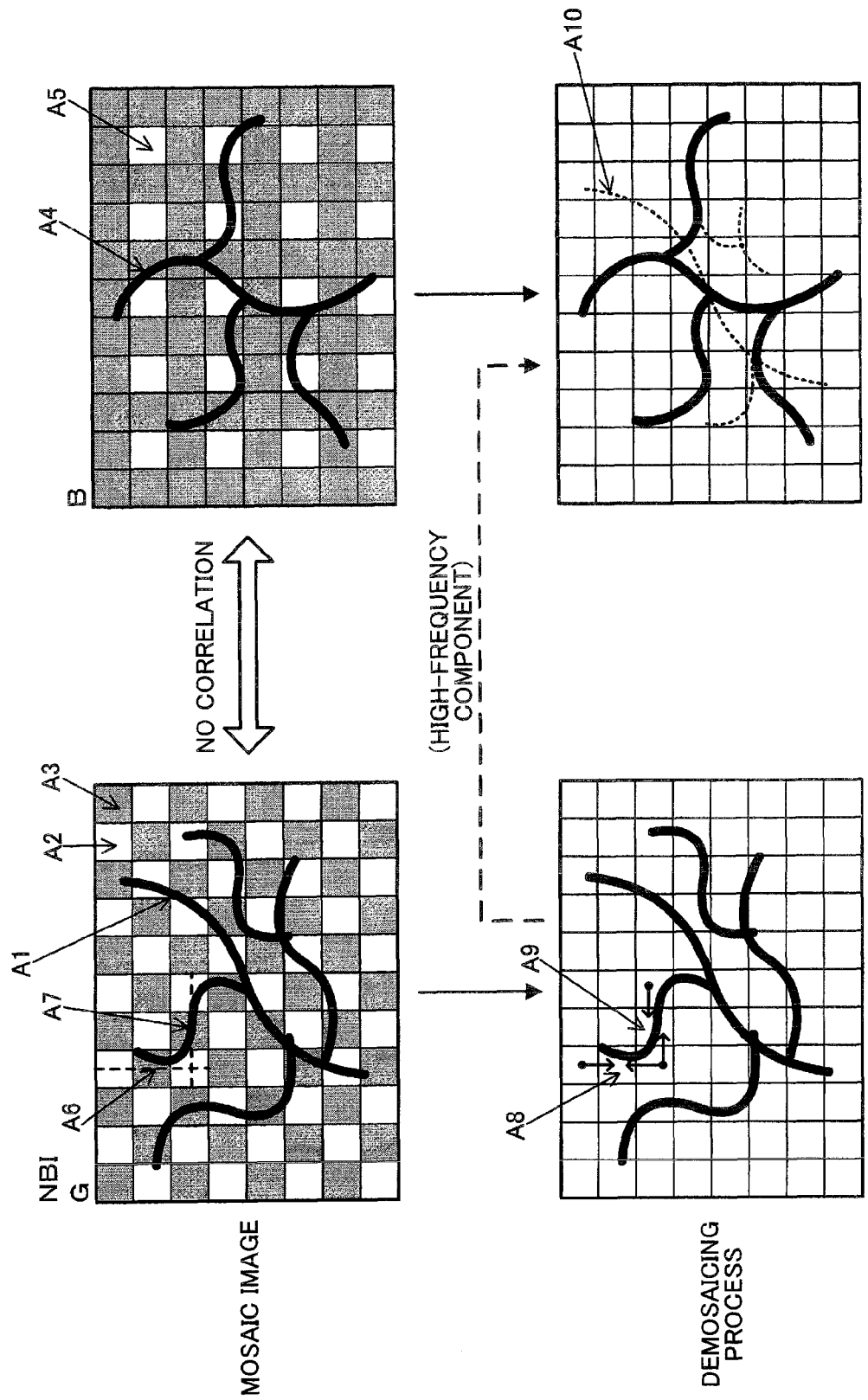
FIG. 2 is a view illustrative of a demosaicing process on a special light image using a color correlation.
Figure 3:
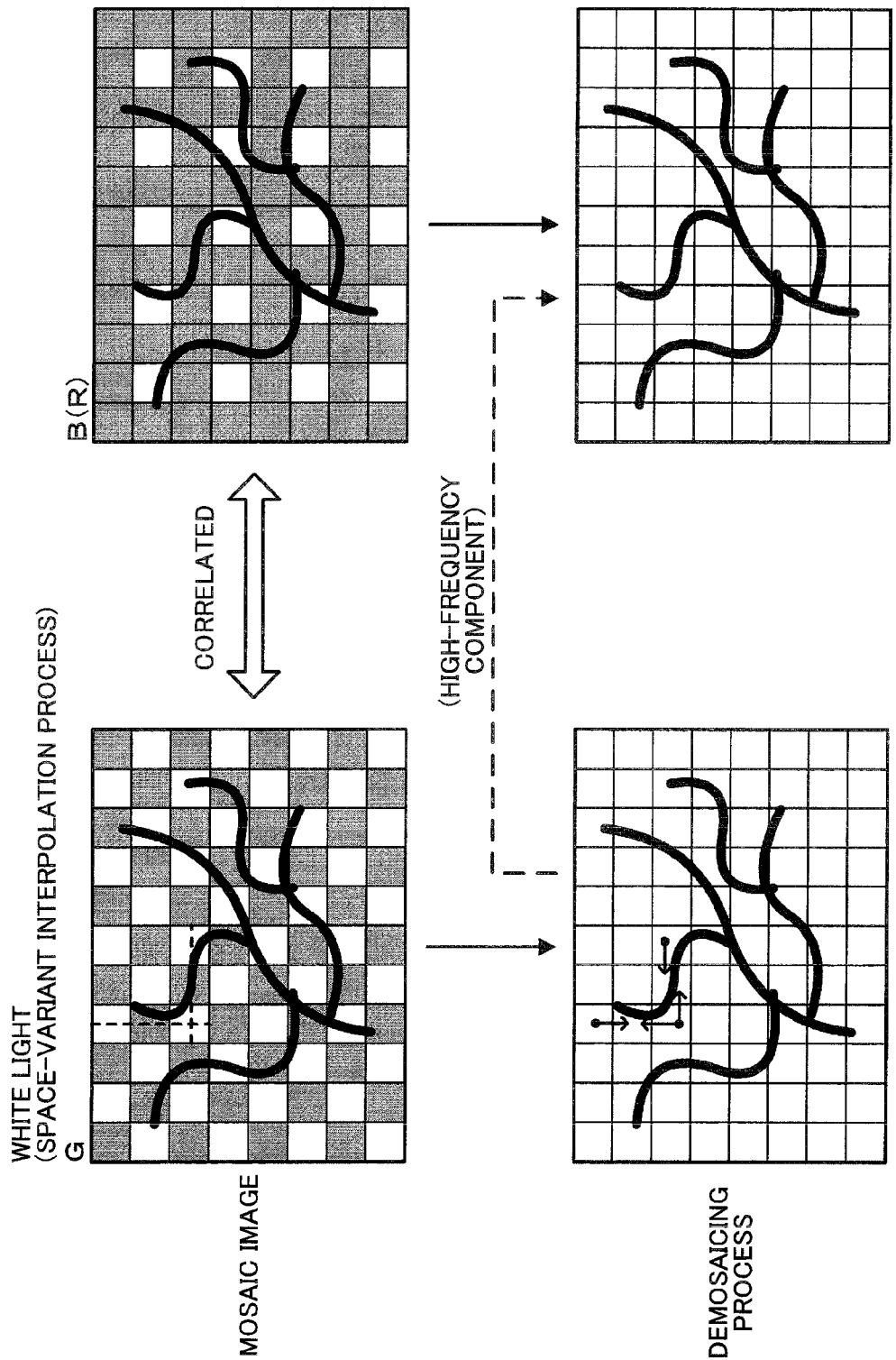
FIG. 3 is a view illustrative of a demosaicing process on a white light image.

A1 in FIG. 2 indicates a blood vessel image obtained using the narrow-band light G2. As indicated by A2, the blood vessel image is acquired as the signal G by the Bayer array imaging element. A dark pixel indicated by A3 indicates a G signal-missing pixel. A4 indicates a blood vessel image obtained using the narrow-band light B2. As indicated by A5, the blood vessel image is acquired as the signal B by the Bayer array imaging element.

For example, a blood vessel (edge) extends in the vertical direction in the G-missing pixel indicated by A6, and a blood vessel extends in the horizontal direction in the G-missing pixel indicated by A7. As indicated by A8, the interpolation process is performed on the pixel in which the blood vessel extends in the vertical direction using the signals G of the peripheral pixels in the vertical direction. As indicated by A9, the interpolation process is performed on the pixel in which the blood vessel extends in the horizontal direction using the signals G of the peripheral pixels in the horizontal direction. The interpolation process is performed on the signal B using the interpolated signal G.

In this case, a high-frequency component included in the interpolated signal G is added to the signal B and the signal R. When the edge direction has been erroneously determined, the effect of the erroneous determination is added to the signal B and the signal R. Therefore, the added component is embedded as an artifact (see A10) so that the image quality deteriorates.

In order to solve the above problem, this embodiment switches over the demosaicing process depending on the image. Specifically, a demosaicing process that utilizes the color correlation is performed on a white light image (see FIG. 3). Specifically, a space-variant interpolation process taking account of the edge direction is performed. Therefore, an image having a sufficient resolution in which a false color occurs to only a small extent can be acquired from a white light image in which the color signals have a correlation (color correlation; e.g., shape correlation).

Figure 4:
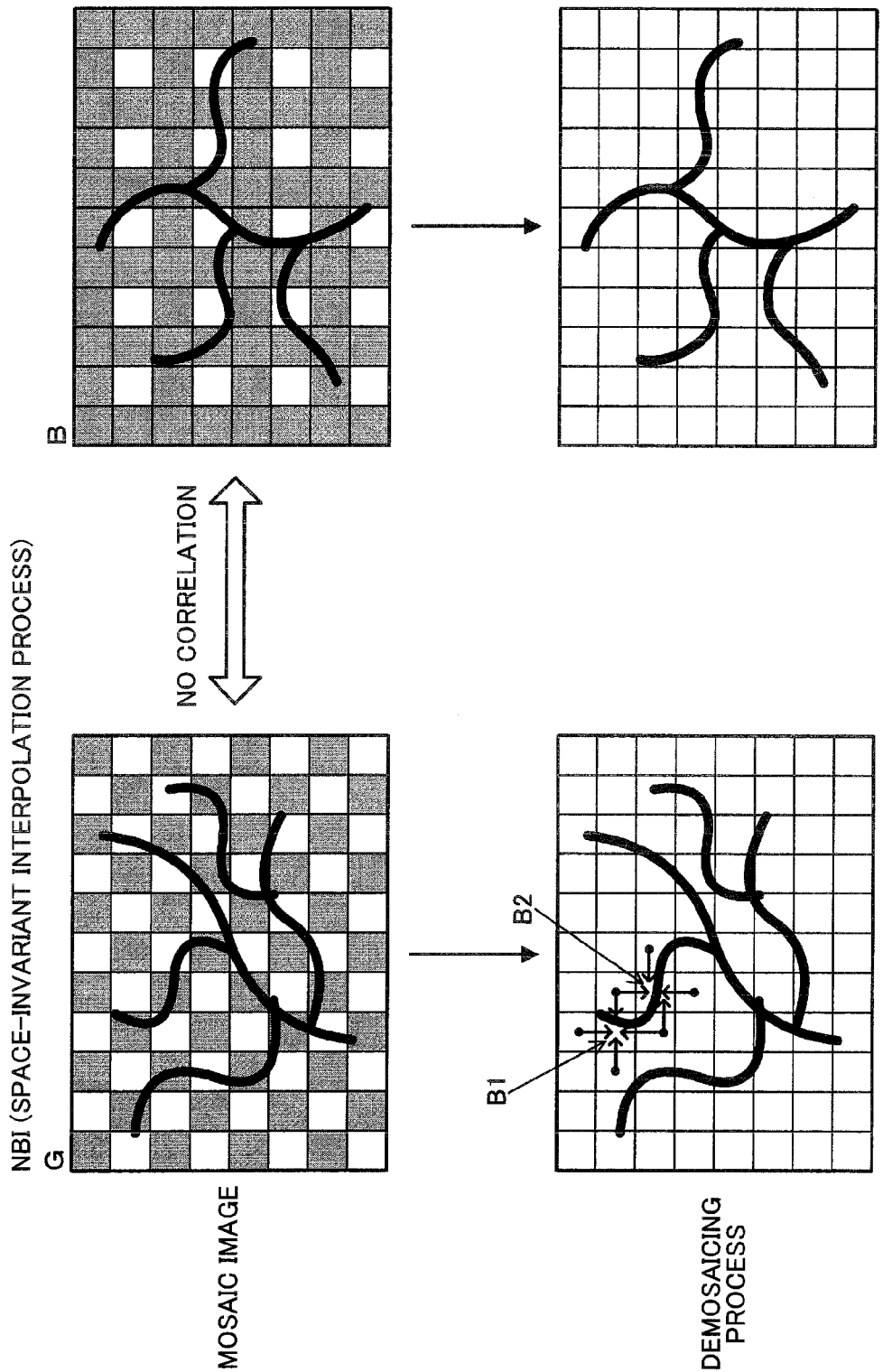
FIG. 4 is a view illustrative of a demosaicing process on a special light image.

As shown in FIG. 4, a demosaicing process that does not utilize the color correlation is performed on a special light image. Specifically, a space-invariant interpolation process that does not take account of the edge direction is performed. For example, each missing pixel is interpolated using the same interpolation method (see B1 and B2 in FIG. 4). This makes it possible to prevent a situation in which a high-frequency component is added due to edge determination, or erroneous determination of the edge direction causes an adverse effect, so that occurrence of an artifact due to the demosaicing process can be suppressed.

2. Configuration Example

Figure 5:
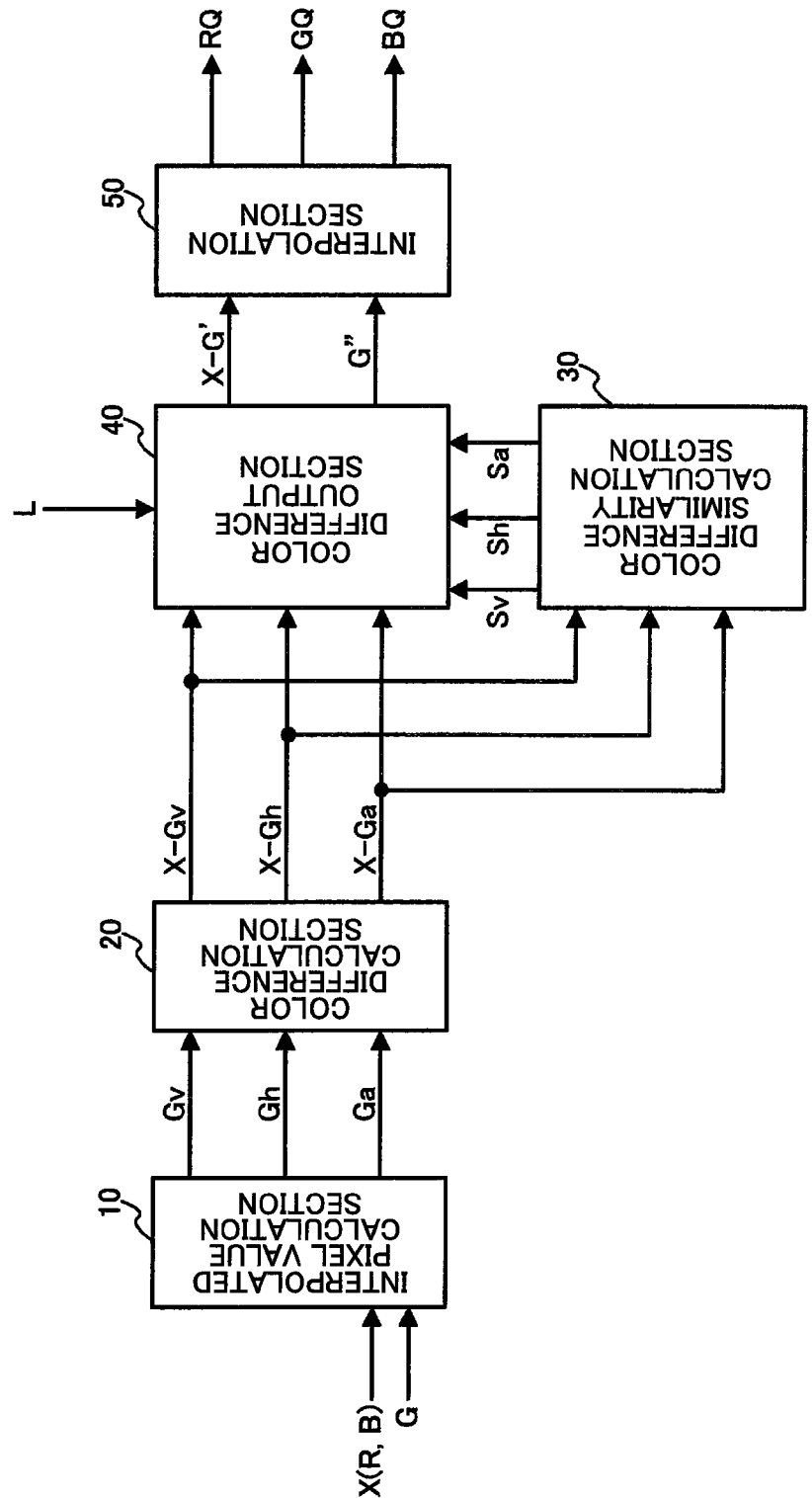
FIG. 5 shows a configuration example according to one embodiment of the invention.

FIG. 5 shows a configuration example of an image processing device according to this embodiment that can switch over the demosaicing process. The image processing device according to this configuration example includes an interpolated pixel value calculation section 10, a color difference calculation section 20, a color difference similarity calculation section 30, a color difference output section 40, and an interpolation section 50 (a RGB calculation section). The following description is given taking an example of a demosaicing process performed on a white light image and a special light image obtained by an endoscope system. Note that this embodiment may also be applied to a demosaicing process performed on images obtained by another imaging apparatus and having a large or small color correlation.

The interpolated pixel value calculation section 10 receives a mosaic image (image in a broad sense) obtained by imaging. Each pixel of the mosaic image has a pixel value of an R, G, or B color signal. The interpolated pixel value calculation section 10 calculates an interpolated pixel value of a pixel that does not have a signal G (i.e., interpolation target pixel). Specifically, the interpolated pixel value calculation section 10 calculates a vertical interpolated pixel value Gv by vertical interpolation, calculates a horizontal interpolated pixel value Gh by horizontal interpolation, and calculates a four-pixel average pixel value Ga by four-pixel averaging (descried later with reference to FIG. 13 and the like).

The color difference calculation section 20 calculates the color difference (differential value) between a signal X (signal R or signal B) and the interpolated pixel value. Specifically, the color difference calculation section 20 calculates a vertical interpolated color difference X–Gv, a horizontal interpolated color difference X–Gh, and a four-pixel average color difference X–Ga.

The color difference similarity calculation section 30 calculates a color difference similarity based on the differential value between the color difference of the interpolation target pixel and the color difference of a peripheral interpolation target pixel. Specifically, the color difference similarity calculation section 30 calculates a vertical color difference similarity Sv from the vertical interpolated color difference X–Gv, calculates a horizontal color difference similarity Sh from the horizontal interpolated color difference X–Gh, and calculates a four-pixel average color difference similarity Sa from the four-pixel average color difference X–Ga. The color difference similarity Sv and the color difference similarity Sh respectively correspond to the edge in the vertical direction and the edge in the horizontal direction, and the color difference similarity Sa corresponds to the edge in the diagonal direction and a flat area having no edge.

The color difference output section 40 selects the color difference X–Gv, X–Gh, or X–Ga, and outputs the selected color difference as an output color difference X–G' of the interpolation target pixel. The color difference output section 40 calculates a signal G of the interpolation target pixel based on the output color difference X–G' and the signal X. The color difference output section 40 outputs an output pixel value G" of the signal G of each pixel together with the original signal G of the mosaic image. Illumination light setting information L (illumination light determination information) is input to the color difference output section 40 from a control section (not shown) or the like. The color difference output section 40 changes the process depending on the illumination light setting information L (described later).

The interpolation section 50 performs an interpolation process (a RGB calculation process). Specifically, the interpolation section 50 outputs RGB pixel values RQ, GQ, and BQ of each pixel based on the output color difference X–G' and the output pixel value G".

Figure 6:
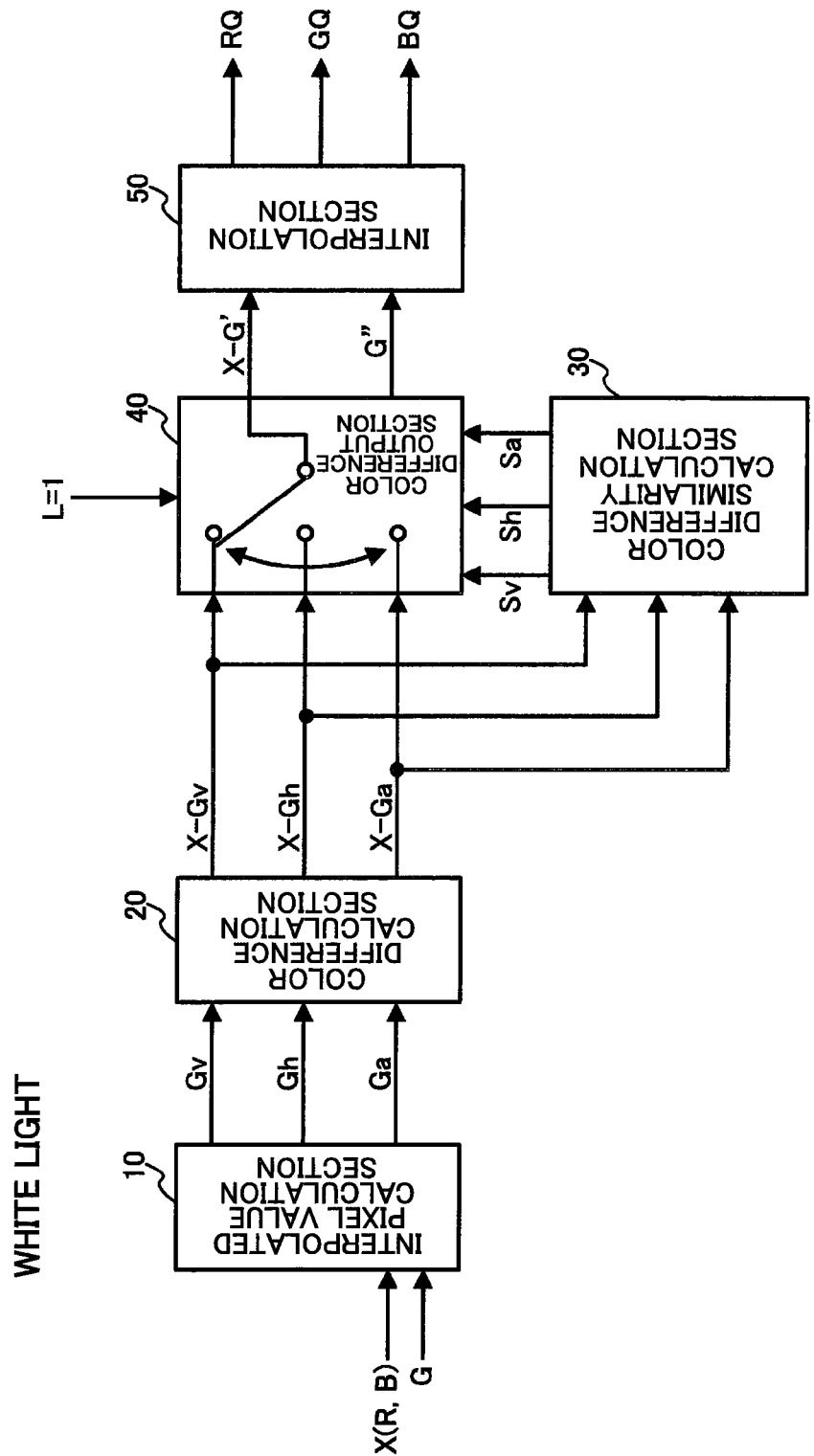
FIG. 6 shows a view illustrative of an operation on a white light image.

An operation according to this embodiment is described below with reference to FIGS. 6 and 7. FIG. 6 shows an operation example when performing an interpolation process on a white light image. Note that a switch included in the color difference output section 40 shown in FIG. 6 schematically illustrates a color difference selection operation of the color difference output section 40. As shown in FIG. 6, a space-variant interpolation process is performed on a white light image. Specifically, a different interpolation process is performed depending on the pixel position. More specifically, the illumination light setting information L (e.g., L=1) corresponding to white light is input to the color difference output section 40. The color difference output section 40 selects the color difference based on the color difference similarities Sv, Sh, and Sa. Specifically, the color difference output section 40 selects the color difference X−Gv when the color difference output section 40 has determined that the edge direction in the signal G interpolation target pixel is the vertical direction, selects the color difference X−Gh when the color difference output section 40 has determined that the edge direction in the signal G interpolation target pixel is the horizontal direction, and selects the color difference X−Ga when the color difference output section 40 has determined that the edge direction in the signal G interpolation target pixel is the diagonal direction or the signal G interpolation target pixel is a flat area.

Figure 7:
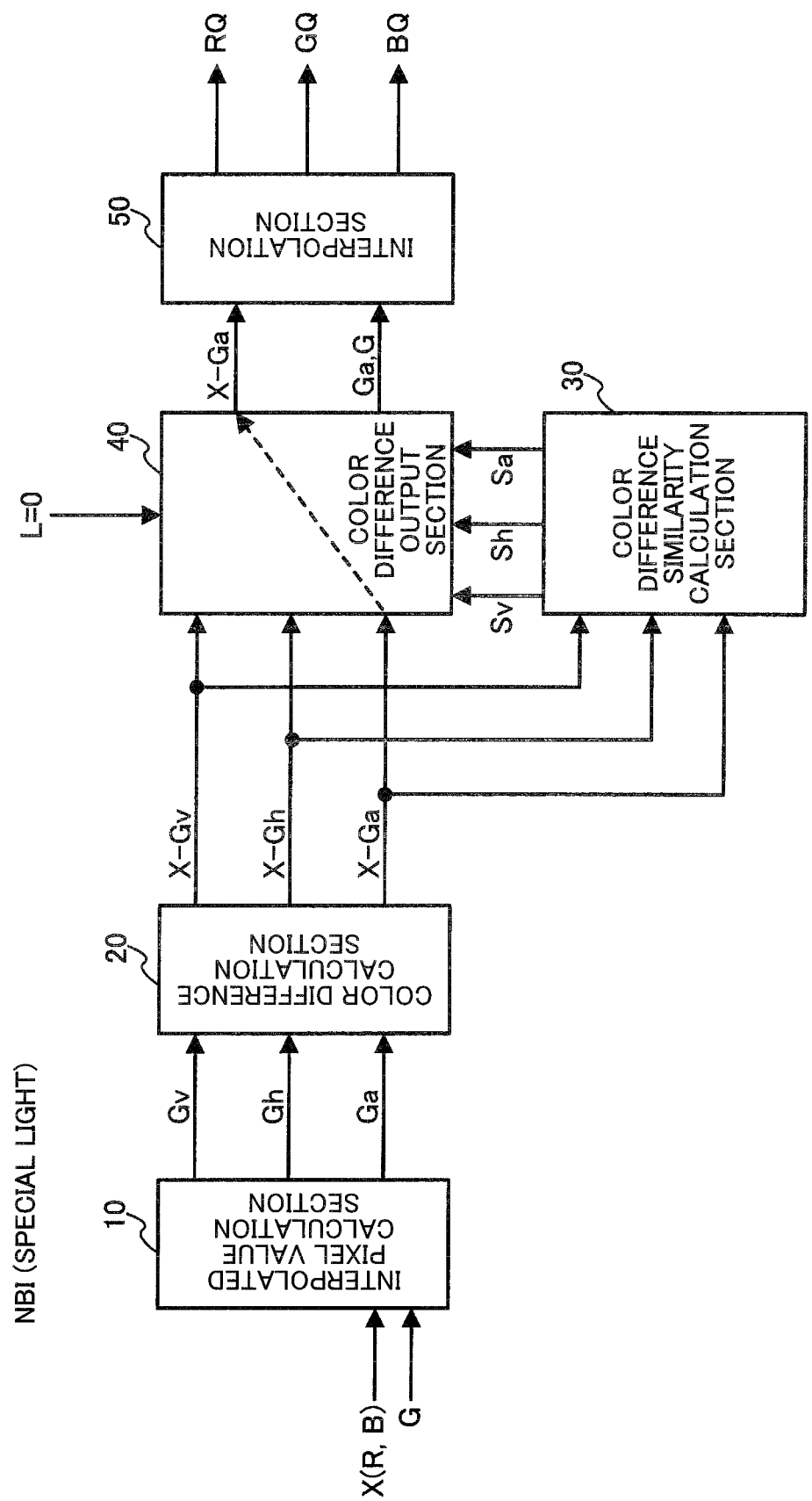
FIG. 7 shows a view illustrative of an operation on a special light image.

FIG. 7 shows an operation example when performing an interpolation process on a special light image. Note that a broken line in the color difference output section 40 shown in FIG. 7 schematically illustrates a fixed color difference output operation of the color difference output section 40. As shown in FIG. 7, a space-invariant interpolation process is performed on a special light image. Specifically, the interpolation process is performed independent of the pixel position. More specifically, the illumination light setting information L (e.g., L=0) corresponding to special light is input to the color difference output section 40. The color difference output section 40 outputs the four-pixel average color difference X−Sa (specific color difference) as the output color difference X−G'.

3. Endoscope System

Figure 8:
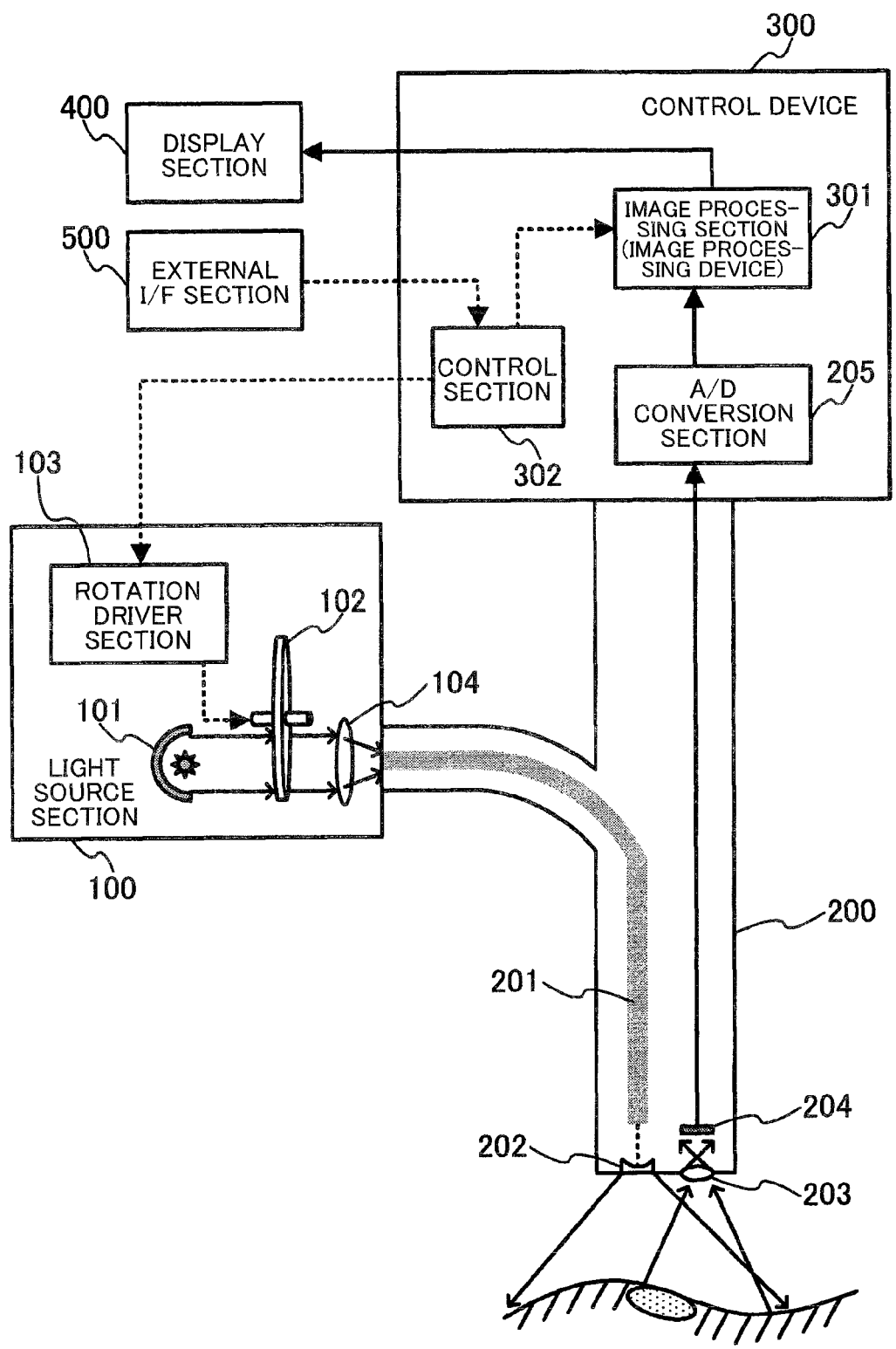
FIG. 8 shows a configuration example of an endoscope system.

When applying the image processing device according to this embodiment to an endoscope system, an appropriate demosaicing process can be performed depending on light applied in vivo. FIG. 8 shows a configuration example of an endoscope system to which the image processing device according to this embodiment is applied. The endoscope system according to this configuration example includes a light source section 100, an insertion section 200 (scope), a control device 300 (processor), a display section 400, and an external I/F section 500 (external interface section).

The light source section 100 generates white light and special light applied to a tissue. Specifically, the light source section 100 includes a white light source 101, a rotary color filter 102 that has a plurality of spectral transmittances, a rotation driver section 103 that drives the rotary color filter 102, and a condenser lens 104 that focuses light that has passed through the rotary color filter 102 on an end face of a light guide fiber 201.

Figure 9:
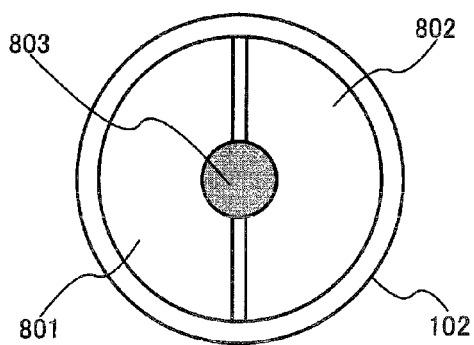
FIG. 9 shows a configuration example of a rotary filter.

As shown in FIG. 9, the rotary color filter 102 includes a color filter 801 that has a white light spectral transmittance, a color filter 802 that has a narrow-band light (special light) spectral transmittance, and a motor 803 that rotates the rotary color filter 102.

Figure 10:
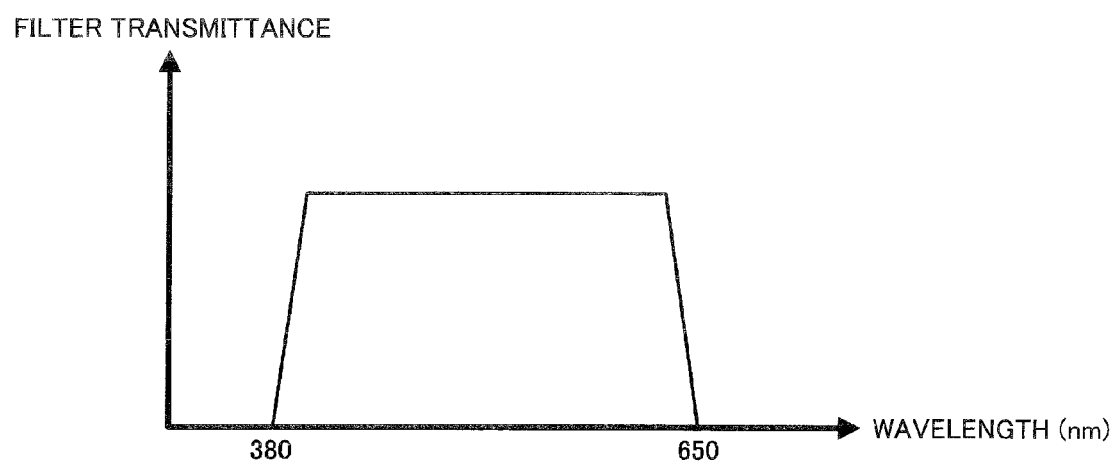
Figure 11:
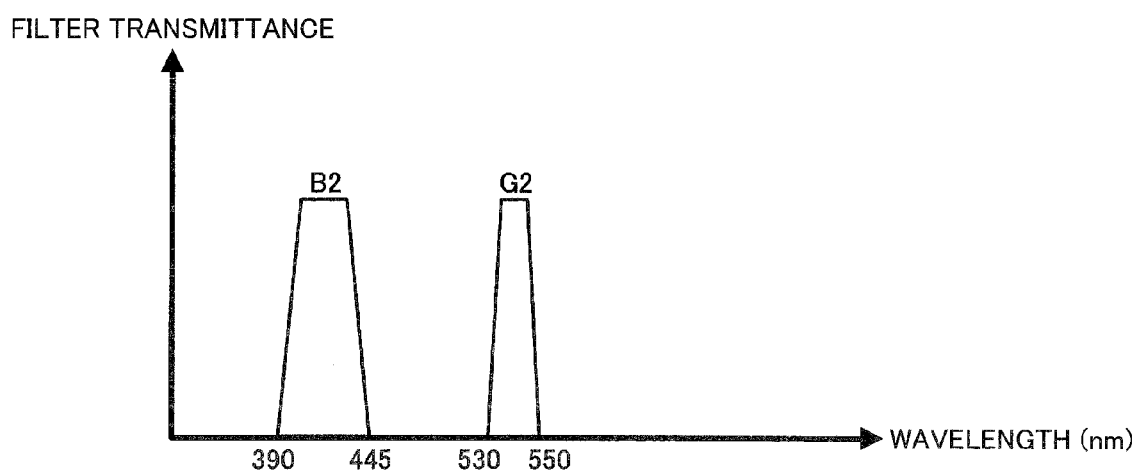

As shown in FIG. 10, the color filter 801 has spectral characteristics that allow light having a wavelength band of 380 to 650 nm to pass through, for example. As shown in FIG. 11, the color filter 802 has spectral characteristics that allow light having a wavelength band of 390 to 445 nm (B2) and light having a wavelength band of 530 to 550 nm (G2) to pass through, for example.

The rotation driver section 103 rotates the rotary color filter 102 at a given rotational speed in synchronization with an imaging period of an imaging element 204 based on a control signal output from a control section 302 of the control device 300. The given rotational speed is a rotational speed at which one complete rotation occurs every two imaging periods of the imaging element 204, for example.

The insertion section 200 is formed to be elongated and flexible (i.e., can be curved) so that the insertion section 200 can be inserted into a body cavity, for example. The insertion section 200 includes the light guide fiber 201, an illumination lens 202, an objective lens 203, and the imaging element 204.

The light guide fiber 201 guides light focused by the condenser lens 104 of the light source section 100 to the end of the insertion section 200. The illumination lens 202 diffuses light that has been guided to the end of the insertion section 200 by the light guide fiber 201 so that the diffused light is applied to an observation target (observation area or object). The objective lens 203 focuses light reflected from the observation target, and forms an image of the observation target on a light-receiving surface (plane) of the imaging element. The imaging element 204 detects the focused reflected light, and acquires the image of the observation target. The imaging element 204 is a primary-color single imaging element having a Bayer array (see FIG. 1A), for example.

The control device 300 controls each element of the endoscope system, processes an acquired (captured) image, and outputs a display image to the display section 400, for example. The control device 300 includes an image processing section 301 (image processing device), the control section 302, and an A/D conversion section 205 (analog-to-digital converter).

The A/D conversion section 205 converts an analog signal obtained by imaging (photoelectric conversion) of the imaging element 204 into a digital signal. The image processing section 301 processes the image data output from the A/D conversion section 205. For example, the image processing section 301 performs a demosaicing process, an edge enhancement process, a color enhancement process, and the like. The control section 302 controls the image processing section 301 and the light source section 100. The control section 302 receives user input information from the external I/F section 500, and switches a photographing mode, for example.

The display section 400 includes a display device (e.g., CRT or liquid crystal monitor) that can display a movie. The display section 400 displays the acquired image that has been processed by the image processing section 301. The user of the endoscope system observes the image displayed on the display section 400, and diagnoses the observed site.

The external I/F section 500 is an interface that allows the user to input information to the endoscope system, for example. The external I/F section 500 includes a power supply switch (power supply ON/OFF switch), a shutter button (photographing operation start button), a mode (e.g., photographing mode) change button, and the like. The external I/F section 500 outputs the input information to the control section 302.

4. Image Processing Section

Figure 12:
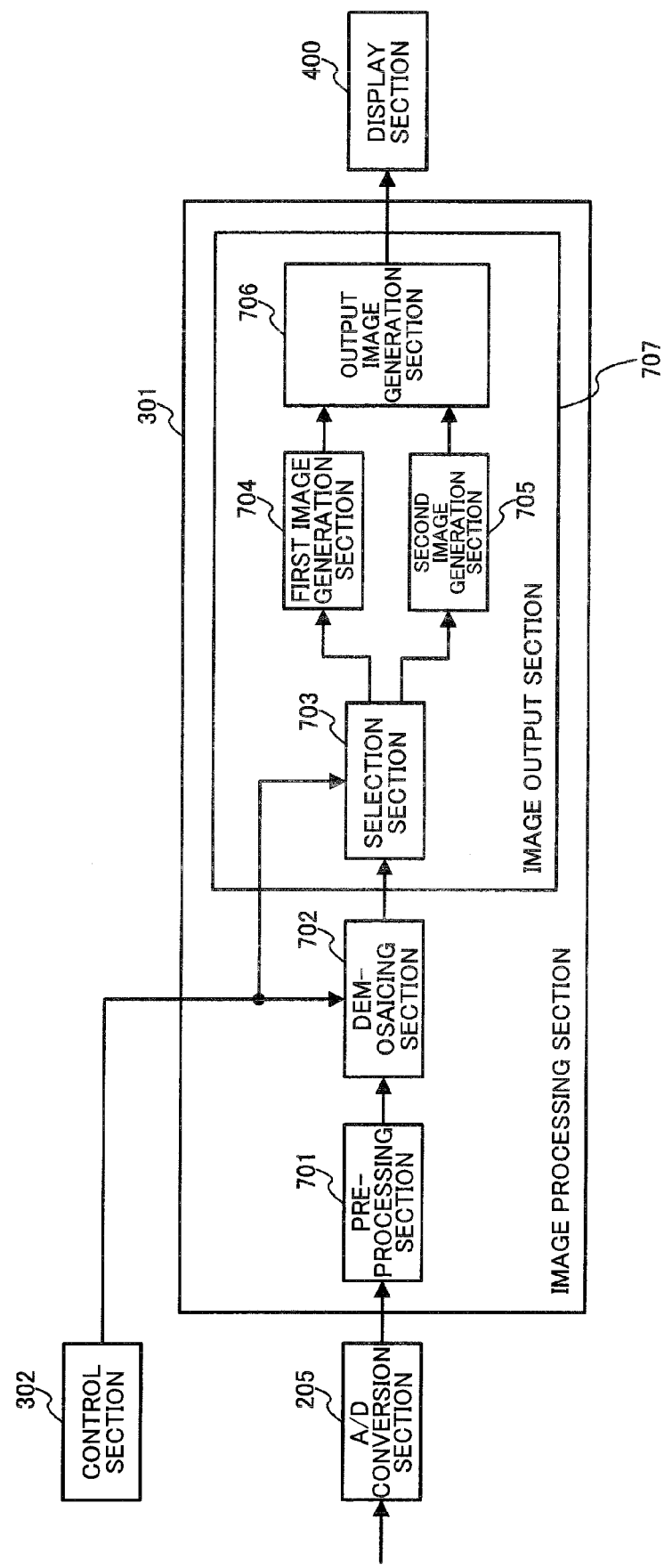
FIG. 12 shows a configuration example of an image processing section.

FIG. 12 shows a detailed configuration example of the image processing section that switches the interpolation process depending on the light source. The image processing section according to this configuration example includes a pre-processing section 701, a demosaicing section 702, and an image output section 707.

The pre-processing section 701 pre-processes the image data output from the A/D conversion section 205, and outputs the pre-processed image data to the demosaicing section 702. Specifically, the A/D conversion section 205 converts the primary-color Bayer array analog signal output from the single imaging element 204 into 12-bit digital data, for example. The pre-processing section 701 performs an OB clamp process, a white balance process, and a noise reduction process on the signal R, the signal G, and the signal B of the digital data. The pre-processing section 701 performs an inter-channel signal balance correction process when photographing special light (2-channel signal).

The demosaicing section 702 receives the Bayer array digital image from the pre-processing section 701, and performs an interpolation process on the digital image. The illumination light setting information (illumination light determination information) is input to the demosaicing section 702 from the control section 302. The demosaicing section 702 generates a color image that includes three color signals corresponding to a spatially identical pixel position based on the illumination light setting information. The details of the demosaicing section 702 are described later with reference to FIG. 14 and the like.

The image output section 707 separates the color image output from the demosaicing section 702 into a white light image and a special light image, and outputs the separated image to the display section 400. Specifically, the image output section 707 includes a selection section 703, a first image generation section 704 (first image acquisition section), a second image generation section 705 (second image acquisition section), and an output image generation section 706.

The selection section 703 separates the color image output from the demosaicing section 702 based on the illumination light setting information output from the control section 302. The selection section 703 outputs the color image to the first image generation section 704 when the illumination light setting information indicates white light, and outputs the color image to the second image generation section 705 when the illumination light setting information indicates special light.

The first image generation section 704 generates a white light image as a first image. For example, the first image generation section 704 converts the input color image to have the color gamut of the display device of the display section 400. For example, the display device is a CRT or a liquid crystal monitor, and the color gamut of the display device is the sRGB color space. The first image generation section 704 performs a grayscale conversion process based on given grayscale conversion characteristics (grayscale conversion characteristics based on the grayscale characteristics of the display section 400), a zoom/rotation process, a structure enhancement process, and the like. The first image generation section 704 generates a white light image that can be output to the display section 400 by performing the above processes, and outputs the generated image to the output image generation section 706.

The second image generation section 705 generates a special light image as a second image. For example, the second image generation section 705 performs a pseudo-color conversion process on the input color image. Only the signal G and the signal B of the color image input to the second image generation section 705 include image information, and the signal R serves as a noise component (see the spectral characteristics shown in FIG. 11). Therefore, the pseudo-color conversion process is a process that converts two color signals into three color signals. For example, the second image generation section 705 uses the signal G of the input image as the signal R of the output image, and uses the signal B of the input image as the signal G and the signal B of the output image. The second image generation section 705 performs a grayscale conversion process based on given grayscale conversion characteristics, a zoom/rotation process, a structure enhancement process, and the like. The second image generation section 705 generates a special light image that can be output to the display section 400 by performing the above processes, and outputs the generated image to the output image generation section 706.

The output image generation section 706 generates the final output image based on the white light image output from the first image generation section 704 and the special light image output from the second image generation section 705, and outputs the generated output image to the display section 400. For example, the output image generation section 706 detects a lesion area (focus area) using the special light image. Specifically, the output image generation section 706 calculates a hue (H) component from the RGB components of the special light image, and extracts areas having a given hue (e.g., H=5 to 30). The output image generation section 706 groups adjacent areas, and determines whether or not the area obtained by grouping is equal to or larger than a given threshold value. When the output image generation section 706 has determined that the area obtained by grouping is equal to or larger than the given threshold value, the output image generation section 706 sets a rectangular or circular area that encloses the grouped area as a lesion area.

The output image generation section 706 performs a motion compensation process on the white light image and the special light image. Specifically, when using the rotation filter 102 (see FIG. 8), the imaging timing differs between white light and special light. Therefore, the output image generation section 706 compensates for the difference in imaging timing by performing the motion compensation process. For example, the output image generation section 706 calculates a global motion vector using the signal B of the white light image and the signal B of the special light image. For example, the output image generation section 706 divides the image into blocks (grids), and calculates the motion vector of each block by pattern matching or the like. The output image generation section 706 corrects the special light image using the calculated motion vector. The output image generation section 706 adds a target color to the area of the white light image corresponding to the lesion area of the corrected special light image, or superimposes (overwrites) the lesion area of the special light image on the white light image to generate the final output image.

5. Demosaicing Section

Figure 13:
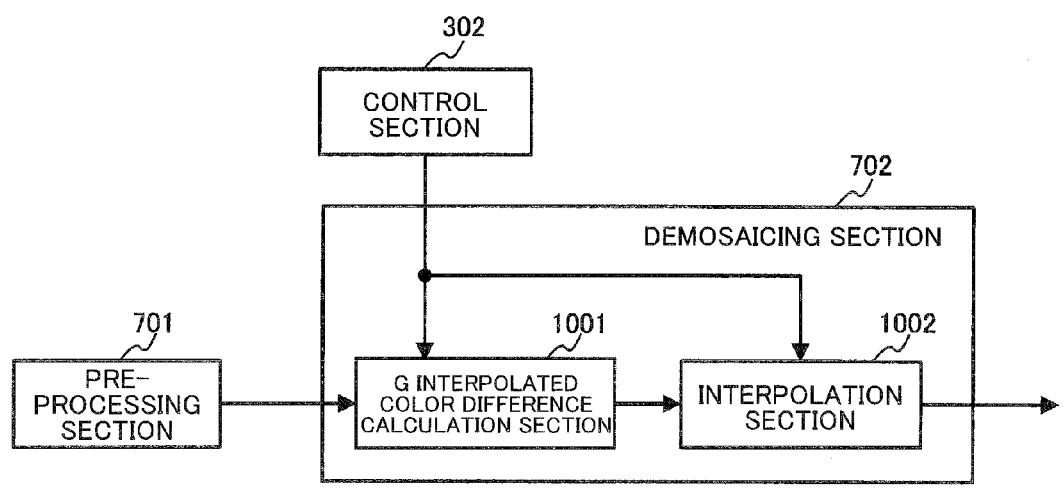
FIG. 13 shows a configuration example of a demosaicing section.

FIG. 13 shows a detailed configuration example of the demosaicing section 702. The demosaicing section 702 according to this configuration example includes a G interpolated color difference calculation section 1001 (first color signal interpolated color difference calculation section), and a interpolation section 1002 (a RGB calculation section).

The G interpolated color difference calculation section 1001 calculates an interpolated signal G (interpolated first color signal or interpolated pixel value) of a G-missing pixel (first color signal-missing pixel or interpolation target pixel), and calculates the color difference of the G-missing pixel. The term "G-missing pixel" refers to a pixel of a Bayer array mosaic image that does not have a signal G, and has a signal R or a signal B, for example. Specifically, the G interpolated color difference calculation section 1001 generates an interpolated signal G based on the signals G of the peripheral pixels of the G-missing pixel, and outputs a signal G image in which a signal G is present at each pixel position. The G interpolated color difference calculation section 1001 generates a color difference signal R–G at each signal R pixel position and a color difference signal B–G at each signal B pixel position, and outputs a color difference signal image in which each G-missing pixel has a color difference signal.

The interpolation section 1002 performs an interpolation process (a RGB calculation process) based on the signal G image and the color difference signal image output from the G interpolated color difference calculation section 1001. Specifically, the interpolation section 1002 calculates the signal G and the color difference signals R–G and B–G of each pixel having a spatially identical position by performing the interpolation process. The interpolation section 1002 generates a signal R and a signal B of each pixel having a spatially identical position with the signal G by adding the color difference signals to the signal G to generate an RGB color image.

A control signal is input to the G interpolated color difference calculation section 1001 and the interpolation section 1002 from the control section 302. For example, the G interpolated color difference calculation section 1001 and the interpolation section 1002 switch the interpolation process based on the illumination light setting information input from the control section 302.

6. G Interpolated Color Difference Calculation Section

Figure 14:
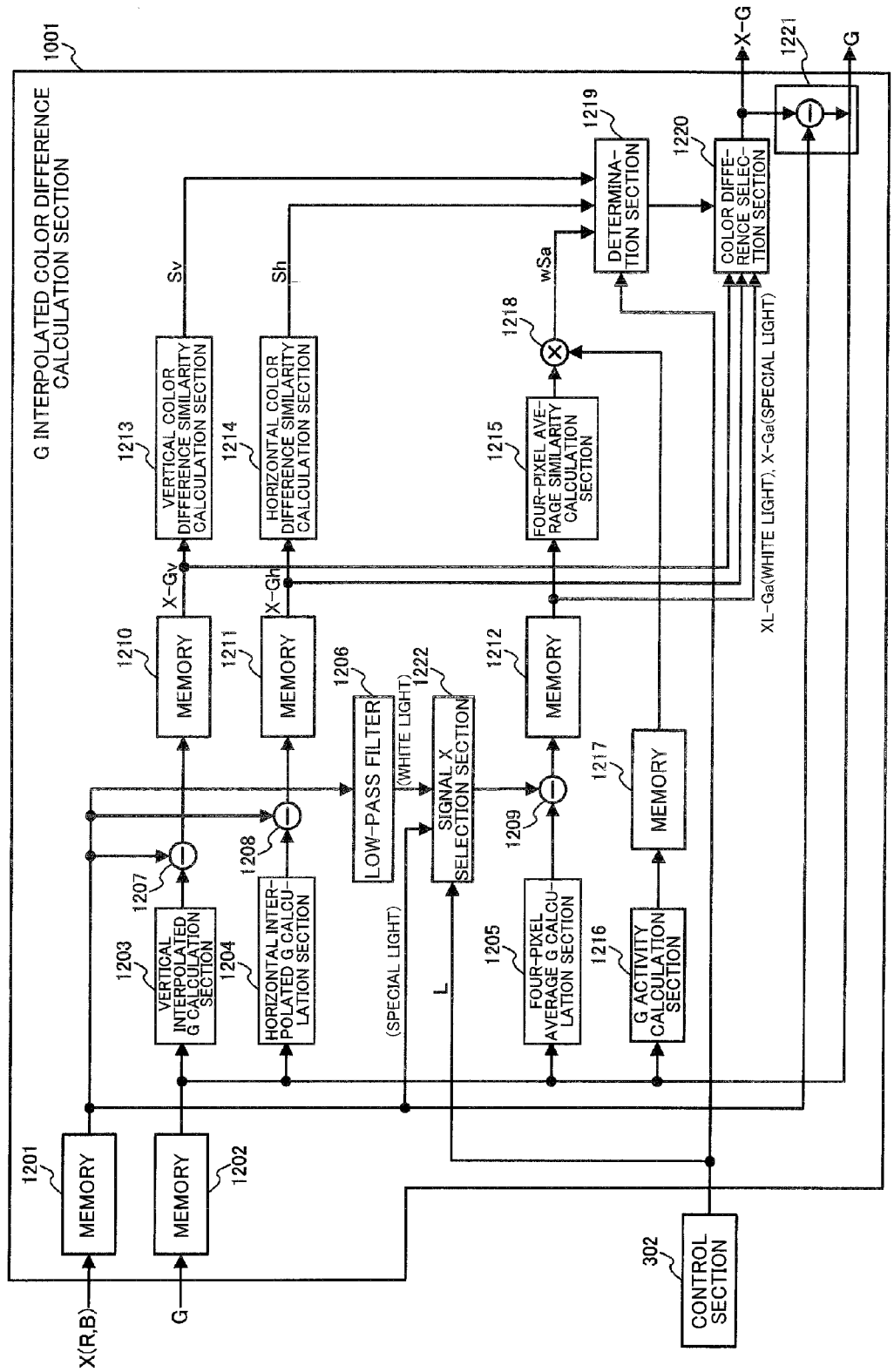
FIG. 14 shows a configuration example of a G interpolated color difference calculation section.

FIG. 14 shows a detailed configuration example of the G interpolated color difference calculation section 1001. The G interpolated color difference calculation section 1001 according to this configuration example includes memories 1201, 1202, 1210, 1211, 1212, and 1217, a vertical interpolated G calculation section 1203, a horizontal interpolated G calculation section 1204, a four-pixel average G calculation section 1205, a low-pass filter 1206, a vertical color difference calculation section 1207 (subtractor), a horizontal color difference calculation section 1208 (subtractor), a four-pixel average color difference calculation section 1209 (subtractor), a vertical color difference similarity calculation section 1213, a horizontal color difference similarity calculation section 1214, a four-pixel average similarity calculation section 1215, a G Activity calculation section 1216, a weight multiplier section 1218 (multiplier), a determination section 1219, a color difference selection section 1220, a signal G output section 1221, and a signal X selection section 1222.

The G interpolated color difference calculation section 1001 performs a space-variant interpolation process on white light by selecting the color difference based on the determination result of the determination section 1219. The G interpolated color difference calculation section 1001 performs an interpolation process that utilizes a color correlation using a signal X processed by the low-pass filter 1206. The G interpolated color difference calculation section 1001 performs a space-invariant interpolation process on special light by outputting the four-pixel average color difference X–Ga (i.e., specific color difference). The G interpolated color difference calculation section 1001 performs an interpolation process that does not utilize a color correlation using the original signal X that is not processed by the low-pass filter 1206.

The memory 1201 stores the signal X (signal R and signal B) of the Bayer array digital image input to the G interpolated color difference calculation section 1001. The memory 1202 stores the signal G of the Bayer array digital image input to the G interpolated color difference calculation section 1001.

Figure 15A:
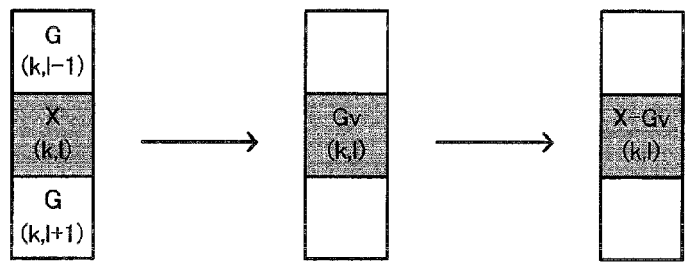
FIGS. 15A to 15C are views illustrative of an signal G interpolated pixel value.

The vertical interpolated G calculation section 1203 receives the signal G stored in the memory 1202, vertically interpolates the G-missing pixel, and outputs a Gv signal (vertical interpolated pixel value) (i.e., interpolated signal G). As shown in FIG. 15A, the vertical interpolated G calculation section 1203 performs the interpolation process using peripheral signal Gs G(k, l−1) and G(k, l+1) of the G-missing pixel (k, l) in the vertical direction. For example, the vertical interpolated G calculation section 1203 outputs a signal Gv(k, l) (={G(k, l−1)+G(k, l+1)}/2). The value k of the pixel position (k, l) is the horizontal coordinate used in the image process, and the value l of the pixel position (k, l) is the vertical coordinate used in the image process. Note that k and l are natural numbers.

Figure 15B:

The horizontal interpolated G calculation section 1204 receives the signal G stored in the memory 1202, horizontally interpolates the G-missing pixel, and outputs a Gh signal (horizontal interpolated pixel value) (i.e., interpolated signal G). As shown in FIG. 15B, the horizontal interpolated G calculation section 1204 performs the interpolation process using the peripheral signal Gs G(k−1, l) and G(k+1, l) of the G-missing pixel (k, l) in the horizontal direction. For example, the horizontal interpolated G calculation section 1204 outputs a signal Gh(k, l) (={G(k−1, l)+G(k+1, l)}/2).

Figure 15C:
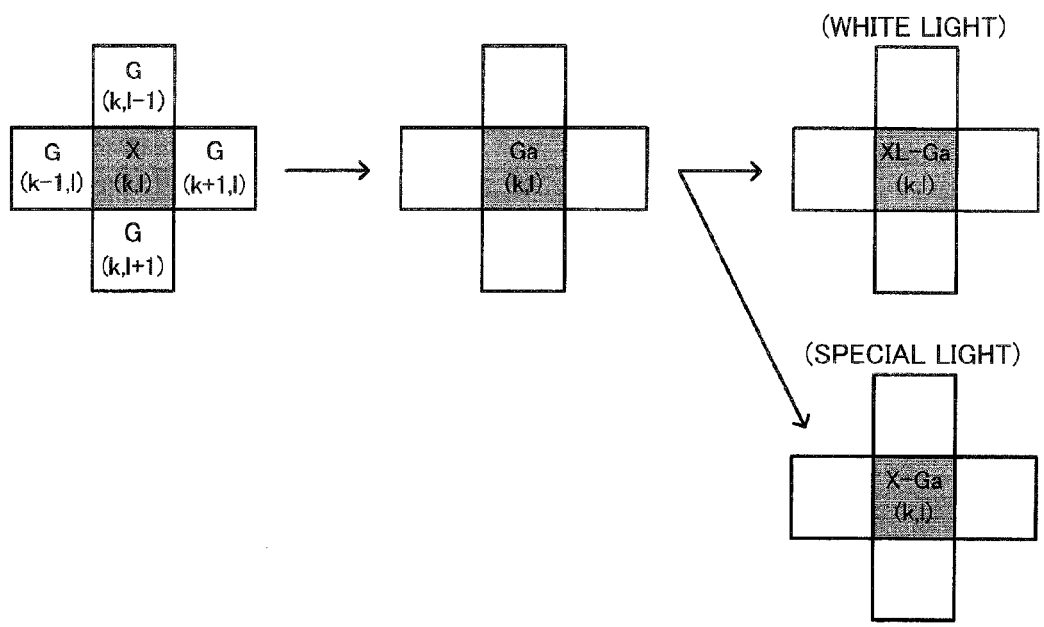

The four-pixel average G calculation section 1205 receives the signal G stored in the memory 1202, interpolates the G-missing pixel by four-pixel averaging, and outputs a Ga signal (four-pixel average pixel value) (i.e., interpolated signal G). As shown in FIG. 15C, the four-pixel average G calculation section 1205 performs the interpolation process using the peripheral signal Gs G(k, l−1), G(k, l+1), G(k−1, l), and G(k+1,l) of the G-missing pixel (k, l) in the vertical direction and the horizontal direction. For example, the four-pixel average G calculation section 1205 outputs a signal Gh(k, l) (={G(k, l−1)+G(k, l+1)+G(k−1, l)+G(k+1, l)}/4).

The vertical color difference calculation section 1207 outputs a signal X–Gv (vertical interpolated color difference) based on the signal Gv output from the vertical interpolated G calculation section 1203 and the signal X stored in the memory 1201. Specifically, the vertical color difference calculation section 1207 outputs a signal X(k, l)−Gv(k, l), as shown in FIG. 15A.

The horizontal color difference calculation section 1208 outputs a signal X–Gh (horizontal interpolated color difference) based on the signal Gh output from the horizontal interpolated G calculation section 1204 and the signal X stored in the memory 1201. Specifically, the horizontal color difference calculation section 1208 outputs a signal X(k, l)−Gh(k, l), as shown in FIG. 15B.

The low-pass filter 1206 receives the signal X stored in the memory 1201, performs a low-pass filtering process on the signal X, and outputs a signal XL obtained by the low-pass filtering process. Specifically, the low-pass filter 1206 blocks a high-frequency component of the signal R using the peripheral signal R, and blocks a high-frequency component of the signal B using the peripheral signal B. For example, the low-pass filter 1206 performs the low-pass filtering process using a cut-off frequency that is half the Nyquist frequency.

The signal X selection section 1222 selects the signal X based on the illumination light setting information L output from the control section 302. Specifically, the signal X selection section 1222 outputs the signal XL output from the low-pass filter 1206 when the illumination light setting information L indicates the white light source (L=1 (first logic level)), and outputs the signal X stored in the memory 1201 when the illumination light setting information L indicates the special light source (L=0 (second logic level)).

The four-pixel average color difference calculation section 1209 outputs the signal X–Ga (four-pixel average color difference) based on the signal Ga output from the four-pixel average G calculation section 1205 and the signal X output from the signal X selection section 1222. Specifically, the four-pixel average color difference calculation section 1209 outputs a signal XL(k, l)−Ga(k, l) when the illumination light setting information L indicates white light, as shown in FIG. 15C. The four-pixel average color difference calculation section 1209 outputs a signal X(k, l)−Ga(k, l) when the illumination light setting information L indicates special light.

Figure 17:
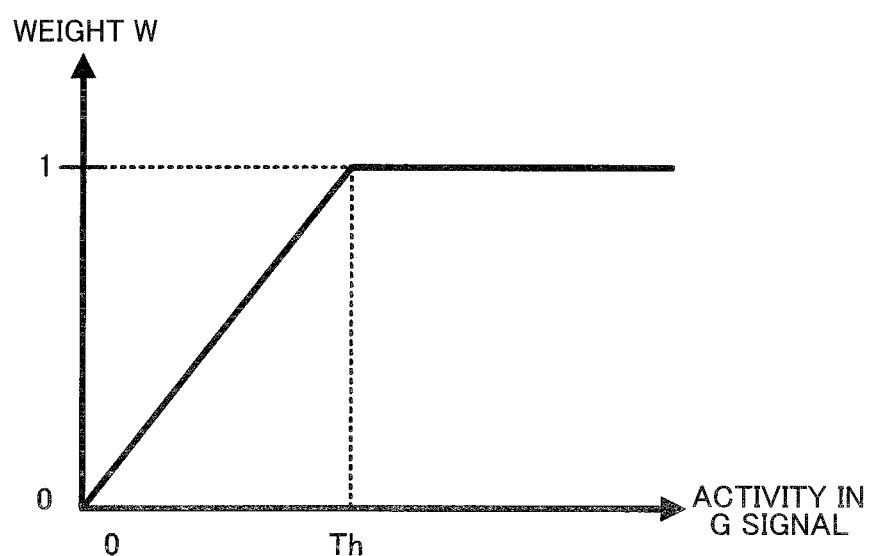
FIG. 17 is a view illustrative of a G Activity calculation section.

The G Activity calculation section 1216 calculates a weight w based on an activity in the signal G. Specifically, the G Activity calculation section 1216 calculates an activity in the signal G around the G-missing pixel based on a plurality of signals G around the G-missing pixel. As shown in FIG. 17, the G Activity calculation section 1216 converts an activity in the signal G into a weight w within the range of 0 to 1, and outputs the weight w. The weight w decreases as an activity in the signal G of the image decreases (e.g., flat area).

The memory 1210 stores the signal X−Gv output from the vertical color difference calculation section 1207. The memory 1211 stores the signal X−Gh output from the horizontal color difference calculation section 1208. The memory 1212 stores a signal XL−Ga or the signal X−Ga output from the four-pixel average color difference calculation section 1209. The memory 1217 stores the weight w output from the G Activity calculation section 1216.

The vertical color difference similarity calculation section 1213 calculates a vertical color difference similarity Sv of the G-missing pixel based on the signal X−Gv stored in the memory 1210. As shown in FIG. 16A, the vertical color difference similarity calculation section 1213 calculates a vertical color difference similarity Sv(k, l) from the sum of the absolute color differences between the peripheral areas (k=−2 to 2, l=−2 to 2) of the pixel position (k, l) in the vertical direction. For example, the vertical color difference similarity calculation section 1213 calculates the vertical color difference similarity Sv(k, l) by the following expression (1). Note that each absolute value may be weighted.

$$Sv(k,l) = |\{X-Gv\}(k-2,l-2)-\{X-Gv\}(k-2,l)|+|\{X-Gv\}(k-2,l)-\{X-Gv\}(k-2,l+2)|+\ldots+|\{X-Gv\}(k+2,l)-\{X-Gv\}(k+2,l+2)| \quad (1)$$

Note that "{X−Gv}(k, l) means "X(k, l)−Gv(k, l)". This also applies to {X−Gh}(k, l), {X−Ga}(k, l), and the like.

The horizontal color difference similarity calculation section 1214 calculates a horizontal color difference similarity Sh of the G-missing pixel based on the signal X−Gh stored in the memory 1211. As shown in FIG. 16B, the horizontal color difference similarity calculation section 1214 calculates a horizontal color difference similarity Sh(k, l) from the sum of the absolute color differences between the peripheral areas (k=−2 to 2, l=−2 to 2) of the pixel position (k, l) in the horizontal direction. For example, the horizontal color difference similarity calculation section 1214 calculates the horizontal color difference similarity Sh(k, l) by the following expression (2). Note that each absolute value may be weighted.

$$Sh(k,l) = |\{X-Gh\}(k-2,l-2)-\{X-Gh\}(k,l-2)|+|\{X-Gh\}(k,l-2)-\{X-Gh\}(k+2,l-2)|+\ldots+|\{X-Gh\}(k,l+2)-\{X-Gh\}(k+2,l+2)| \quad (2)$$

The four-pixel average similarity calculation section 1215 calculates a four-pixel average similarity Sa of the G-missing pixel based on the signal X−Ga stored in the memory 1212. As shown in FIGS. 16C and 16D, the four-pixel average similarity calculation section 1215 calculates a four-pixel average similarity Sa(k, l) from the sum of the absolute color differences between the pixel position (k, l) and the peripheral areas (k=−2 to 2, l=−2 to 2) of the pixel position (k, l). For example, the four-pixel average similarity calculation section 1215 calculates the four-pixel average similarity Sa(k, l) by the following expression (3) (white light) or (4) (special light). Note that each absolute value may be weighted.

$$Sa(k,l) = \{|\{XL-Ga\}(k-2,l-2)-\{XL-Ga\}(k,l)|+|\{XL-Ga\}(k,l-2)-XL-Ga\}(k,l)|+\ldots+|\{XL-Ga\}(k-2,l)-\{XL-Ga\}(k,l)|\}+|\{XL-Ga\}(k-1,l-1)-\{XL-Ga\}(k+1,l+1)|+|\{XL-Ga\}(k+1,l-1)-XL-Ga\}(k-1,l+1)|\} \quad (3)$$

$$Sa(k,l) = \{|\{X-Ga\}(k-2,l-2)-\{X-Ga\}(k,l)|+|\{X-Ga\}(k,l-2)-X-Ga\}(k,l)|+\ldots+|\{X-Ga\}(k-2,l)-\{X-Ga\}(k,l)|\}+|\{X-Ga\}(k-1,l-1)-\{X-Ga\}(k+1,l+1)|+|\{X-Ga\}(k+1,l-1)-X-Ga\}(k-1,l+1)|\} \quad (4)$$

The weight multiplier section 1218 multiplies the weight w(k, l) output from the memory 1217 by the four-pixel average similarity Sa(k, l) output from the four-pixel average similarity calculation section 1215, and outputs a weighted four-pixel average similarity w(k, l)×Sa(k, l).

The determination section 1219 outputs color difference type information to the color difference selection section 1220 based on the illumination light determination information L input from the control section 302. Specifically, when the illumination light setting information L indicates white light (L=1), the determination section 1219 determines the minimum value of the color difference similarities Sv(k, l), Sh(k, l), and w(k, l)×Sa(k, l), and outputs the color difference type information about the color difference corresponding to the minimum color difference similarity. When the illumination light setting information L indicates special light (L=0), the determination section 1219 outputs the color difference type information about the four-pixel average color difference as fixed specific color difference type information.

The color difference similarities Sv, Sh, and wSa used for determination when L=1 indicate a higher color difference similarity as the value decreases. Specifically, a pixel having an edge in the vertical direction has a small color difference similarity Sv, a pixel having an edge in the horizontal direction has a small color difference similarity Sv, and a pixel having an edge in the diagonal direction or a pixel having a flat area has a small color difference similarity Sa. Therefore, the edge direction can be determined by determining the minimum color difference similarity. A flat area having no edge has a small weight w and a small color difference similarity wSa. Therefore, the color difference similarity wSa of the flat area is easily determined to be a minimum value, so that erroneous edge determination due to noise can be suppressed.

The color difference selection section 1220 selects the color difference corresponding to the color difference type information input from the determination section 1219 from the signal X−Gv, the signal X−Gh, and the signal X−Ga stored in the memories 1210, 1211, and 1212, and outputs the selected color difference as the output color difference X−G.

The signal G output section 1221 subtracts the color difference output from the color difference selection section 1220 from the signal X output from the memory 1201 using a subtractor to calculate the signal G of the G-missing pixel. The signal G output section 1221 also outputs the signal G output from the memory 1202. The signal G output section 1221 thus outputs the signal G of each pixel.

In this embodiment, the process is switched based on the illumination light setting information L output from the control section 302. The switch operation and the output color difference of the G interpolated color difference calculation section 1001 in each process are described in detail below.

When the illumination light setting information L indicates white light (L=1), the mode is set to a color correlation utilization mode. In the color correlation utilization mode, the determination section 1219 determines the minimum color difference similarity. Specifically, the interpolation process is performed using the correlation between the signal R and the signal G or the correlation between the signal B and the signal G. More specifically, the signal G of the G-missing position is interpolated using the signal G that is adjacent thereto along the high-correlation direction, and the color difference is calculated using the interpolated signal G.

In the color correlation utilization mode, the signal XL output from the low-pass filter 1206 is selected when the color difference similarity w(k, l)×Sa(k, l) has been selected, and the color difference XL−Ga is calculated. Therefore, the color difference output section 1221 calculates the difference between the color difference XL−Ga and the signal X (i.e., X−(XL−Ga)=Ga+(X−XL)=Ga+ΔX). Specifically, detaIX (i.e., a high-frequency component of the signal X) is added to the signal Ga of a four-pixel average low-frequency component. The signal G is thus generated utilizing the color correlation.

When the color difference similarities Sv(k, l) and Sh(k, l) have been selected, the color difference output section 1221 outputs the signals Gv and Gh. A high-frequency component of the edge included in these signals G is added to the signal R and the signal B by the interpolation section 1002.

When the illumination light setting information L indicates special light (L=0), the mode is set to a color correlation non-utilization mode. In the color correlation non-utilization mode, the determination section 1219 necessarily selects the four-pixel average similarity Sa(k, l)×w(k, l). Specifically, the interpolation process is performed without using the correlation between the signal R and the signal G or the correlation between the signal B and the signal G. More specifically, the signal G of the G-missing position is interpolated (average value) using the four peripheral signals G, and the color difference is calculated using the interpolated signal G.

In the color correlation non-utilization mode, the signal X output from the memory 1201 is selected, and the color difference X−Ga is calculated. Therefore, the color difference output section 1221 calculates the difference between the color difference X−Ga and the signal X (i.e., X−(X−Ga)=Ga). Therefore, a high-frequency component of the signal X is not added to the signal G, and the four-pixel average signal G that does not utilize the color correlation is generated.

7. Interpolation Section

Figure 18:
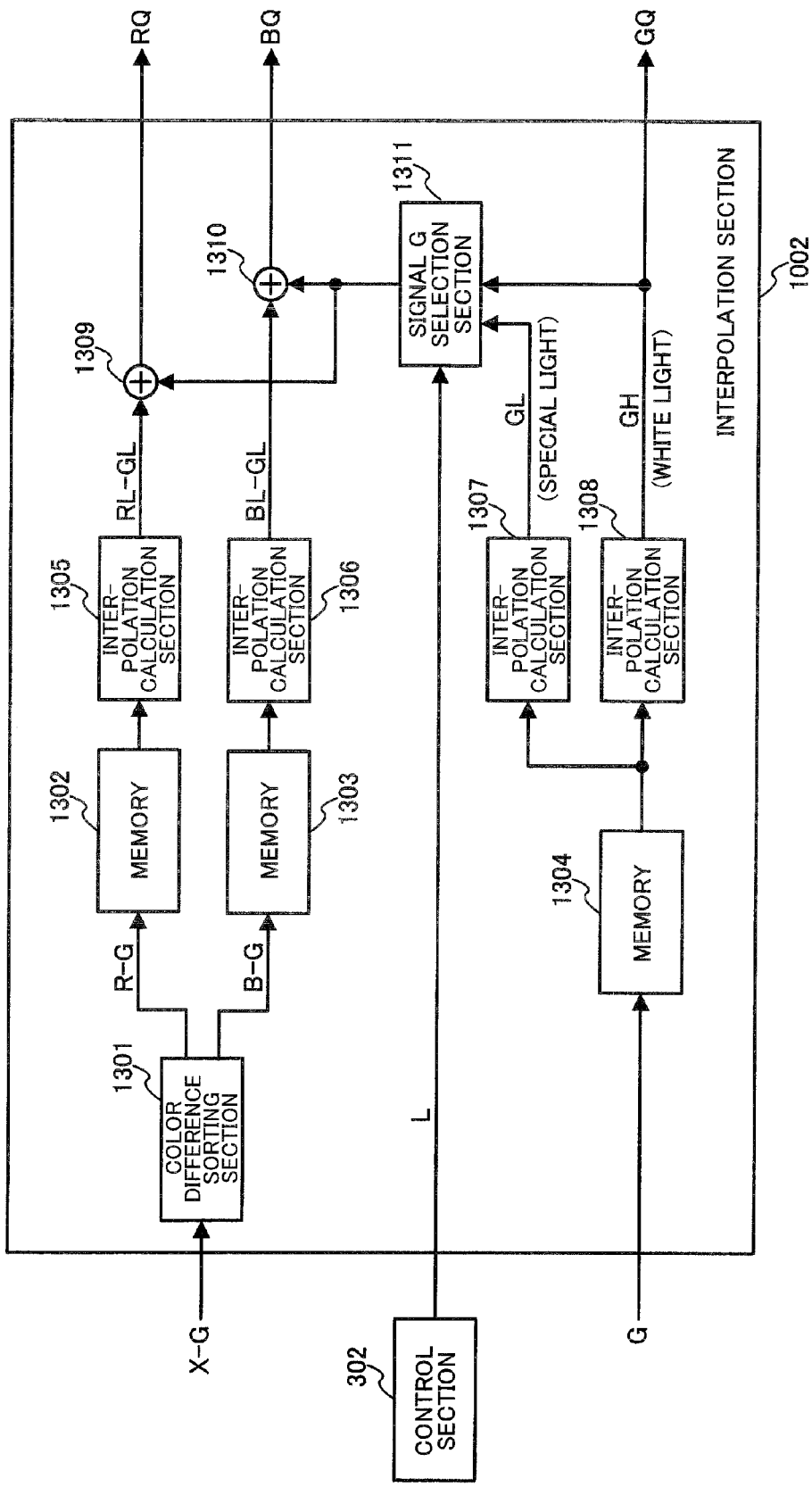
FIG. 18 shows a configuration example of an interpolation section.

FIG. 18 shows a detailed configuration example of the interpolation section 1002. The interpolation section 1002 according to this configuration example includes a color difference sorting section 1301 (color difference separation section), memories 1302, 1303, and 1304, a first interpolation calculation section 1308, a second interpolation calculation section 1307, a third interpolation calculation section 1305, a fourth interpolation calculation section 1306, a signal R calculation section 1309 (adder), a signal B calculation section 1310 (adder), and a signal G selection section 1311.

When the illumination light setting information L indicates white light, the interpolation section 1002 performs the interpolation process utilizing the color correlation by calculating the signal R and the signal B using the signal G processed by the broad-band interpolation calculation section 1308. When the illumination light setting information L indicates special light, the interpolation section 1002 performs the interpolation process without utilizing the color correlation by calculating the signal R and the signal B using the signal G processed by the narrow-band interpolation calculation section 1307.

Specifically, the color difference sorting section 1301 separates the signal X−G output from the G interpolated color difference calculation section 1001 into a signal R−G and a signal B−G. The image data of the signal R−G indicates that the signal R−G is present at the signal R pixel position of the Bayer array. The image data of the signal B−G indicates that the signal B−G is present at the signal B pixel position of the Bayer array.

The memory 1302 stores the signal R−G separated by the color difference sorting section 1301. The memory 1303 stores the signal B−G separated by the color difference sorting section 1301. The memory 1304 stores the signal G output from the G interpolated color difference calculation section 1001.

The interpolation calculation section 1308 performs an interpolation filter process having first low-pass filter characteristics on the signal G stored in the memory 1304, and outputs a signal GH obtained by the interpolation filter process. Specifically, the interpolation calculation section 1308 multiplies the signal G in the peripheral area (given area) of the processing target pixel position (given position) by a filter coefficient (interpolation coefficient) corresponding to the first low-pass filter characteristics to generate the signal G at the processing target pixel position. This interpolation filter process generates the signal G of each pixel.

The interpolation calculation section 1307 performs an interpolation filter process having second low-pass filter characteristics differing from the first low-pass filter characteristics on the signal G stored in the memory 1304, and outputs a signal GL obtained by the interpolation filter process. Specifically, the interpolation calculation section 1307 multiplies the signal G in the peripheral area (given area) of the processing target pixel position (given position) by a filter coefficient corresponding to the second low-pass filter characteristics to generate the signal G at the processing target pixel position. This interpolation filter process generates the signal G of each pixel.

The interpolation calculation section 1305 performs an interpolation filter process having the second low-pass filter characteristics on the signal R−G stored in the memory 1302, and outputs a signal RL−GL obtained by the interpolation filter process. Specifically, the interpolation calculation section 1305 multiplies the signal R−G in the peripheral area (given area) of the processing target pixel position (given position) by a filter coefficient corresponding to the second low-pass filter characteristics to generate the signal R−G at the processing target pixel position. This interpolation filter process generates the signal R−G of each pixel.

The interpolation calculation section 1306 performs an interpolation filter process having the second low-pass filter characteristics on the signal B−G stored in the memory 1303, and outputs a signal BL−GL obtained by the interpolation filter process. Specifically, the interpolation calculation section 1306 multiplies the signal B−G in the peripheral area (given area) of the processing target pixel position (given position) by a filter coefficient corresponding to the second low-pass filter characteristics to generate the signal B−G at the processing target pixel position. This interpolation filter process generates the signal B−G of each pixel.

The signal G selection section 1311 outputs the signal GH output from the interpolation calculation section 1308 when the illumination light setting information L output from the control section 302 indicates white light (L=1), and outputs the signal GL output from the interpolation calculation section 1307 when the illumination light setting information L output from the control section 302 indicates special light (L=0).

The signal R calculation section 1309 adds the signal R−G output from the interpolation calculation section 1305 to the signal GH (or the signal GL) output from the signal G selection section 1311, and outputs a signal RQ.

The signal R calculation section 1310 adds the signal B–G output from the interpolation calculation section 1306 to the signal GH (or the signal GL) output from the signal G selection section 1311, and outputs a signal BQ.

The interpolation section 1002 switches the interpolation process between the interpolation process that utilizes the color correlation and the interpolation process that does not utilize the color correlation based on the illumination light. The switch operation is described in detail below.

Figure 19:
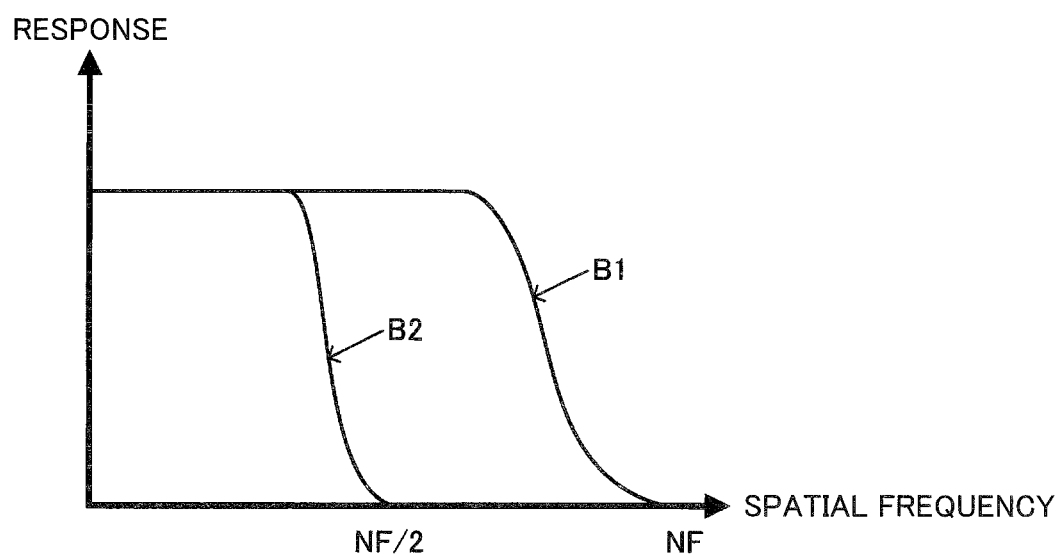
FIG. 19 is a view illustrative of first and second low-pass filtering processes.

As indicated by B1 in FIG. 19, the first low-pass filter characteristics of the interpolation calculation section 1308 are frequency characteristics that are attenuated at a Nyquist frequency NF. As indicated by B2, the second low-pass filter characteristics of the interpolation calculation sections 1305, 1306, and 1307 are frequency characteristics that are attenuated at a frequency NF/2 that is half the Nyquist frequency NF.

When the illumination light setting information L indicates white light, the signal G selection section 1311 outputs the signal GH output from the interpolation calculation section 1308. Therefore, the signal R calculation section 1309 adds the signal RL–GL having a band that is half the band of the Nyquist frequency to the signal GH having the band of the Nyquist frequency. This is equivalent to adding the signal G (edge component of the signal G) having a band higher than half the Nyquist frequency to the signal R having a band that is half the band of the Nyquist frequency. Specifically, the signal R is generated utilizing the color correlation. The signal B is also generated utilizing the color correlation.

When the illumination light setting information L indicates special light, the signal G selection section 1311 outputs the signal GL output from the interpolation calculation section 1307. Therefore, the signal R calculation section 1309 adds the signal RL–GL having a band that is half the band of the Nyquist frequency to the signal GL having a band that is half the band of the Nyquist frequency. In this case, only the signal R having a band that is half the band of the Nyquist frequency remains, and a high-frequency component of the signal G is not added. Specifically, the signal R is generated without utilizing the color correlation. The signal B is also generated without utilizing the color correlation.

The interpolation section 1002 outputs the signal GH output from the interpolation calculation section 1308 as the output signal GQ. When the illumination light setting information L indicates special light, the output signal GQ has a frequency band twice that of the output signals RQ and BQ. Note that the signals RQ, GQ, and BQ may have an identical frequency band. Specifically, the interpolation section 1002 may output the signal GL output from the interpolation calculation section 1307 as the output signal GQ when the illumination light setting information L indicates special light.

This embodiment has been described taking an example in which the illumination light determination information L output from the control section 302 is input to the image processing section 301 in synchronization with the control information about the rotary color filter 102. Note that the configuration is not limited thereto. For example, the sum of the signals G and the signals R output from the pre-processing section 701 of the image processing section 301 may be calculated corresponding to one screen, it may be determined that the signal is an image signal illuminated by special light when the sum of the signals G is larger than a first threshold value Th1, and the sum of the signals R is smaller than a second threshold value Th2, and the image signal may be used as illumination determination information. In this case, it is desirable to set the threshold values so that Th1>>Th2 is satisfied in order to prevent erroneous determination.

This embodiment has been described taking an example using the Bayer array primary color single imaging element shown in FIG. 1A. Note that the Bayer array primary color single imaging element shown in FIG. 1B that is inclined by 45° may also be used. In this case, the interpolation process on the G-missing pixel using the peripheral signals G may be changed to an interpolation process using the peripheral signals G in the diagonally right upward direction and the diagonally right downward direction.

8. Software

In this embodiment, each section of the image processing section 301 is implemented by hardware. Note that the configuration of the image processing section 301 is not limited thereto. For example, a CPU may perform the process of each section on an image acquired using an imaging apparatus such as a capsule endoscope. Specifically, the process of each section may be implemented by means of software by causing the CPU to execute a program. Alternatively, part of the process of each section may be implemented by means of software.

When separately providing the imaging section, and implementing the process of each section of the image processing section 301 by means of software, a known computer system (e.g., work station or personal computer) may be used as the image processing device. A program (image processing program) that implements the process of each section of the image processing section 301 may be provided in advance, and executed by the CPU of the computer system.

Figure 20:
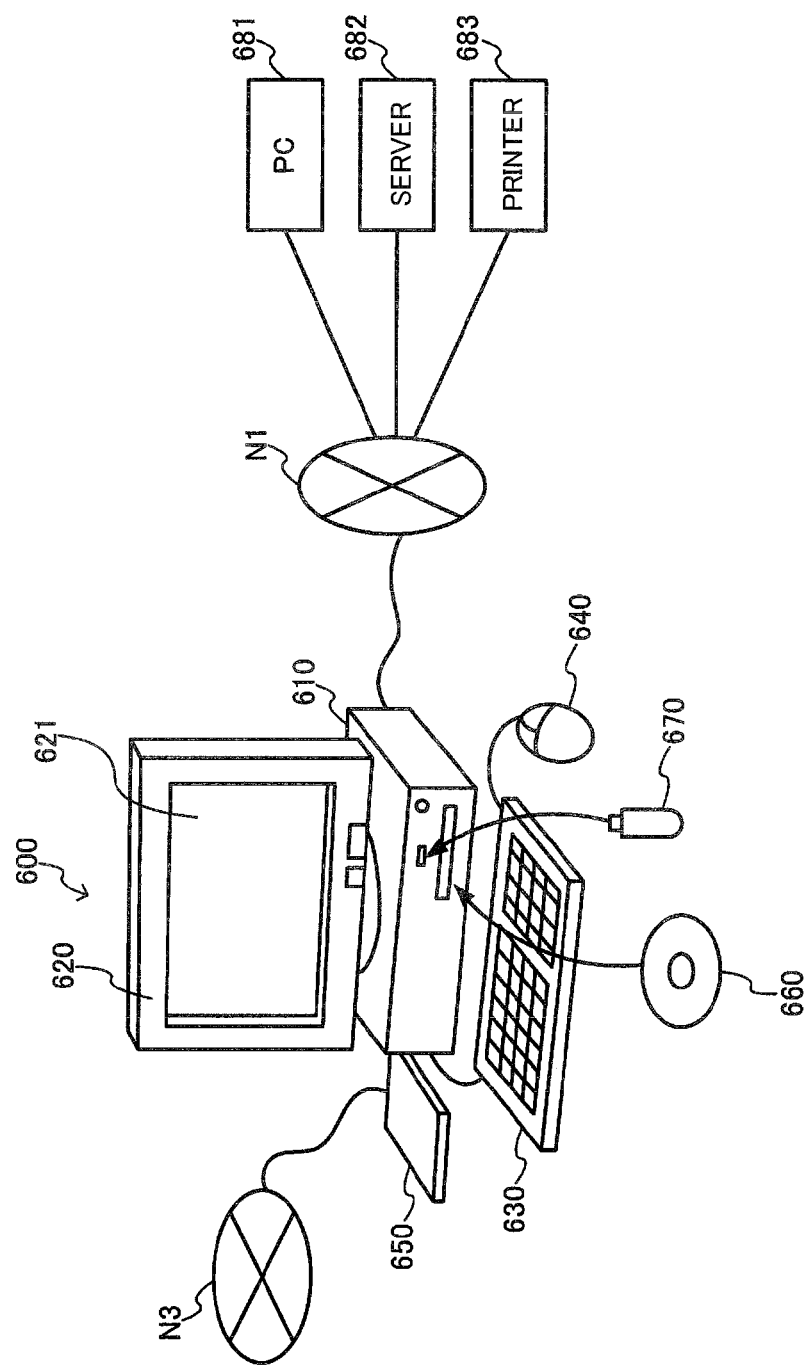
FIG. 20 shows a system configuration example of a computer system.
Figure 21:
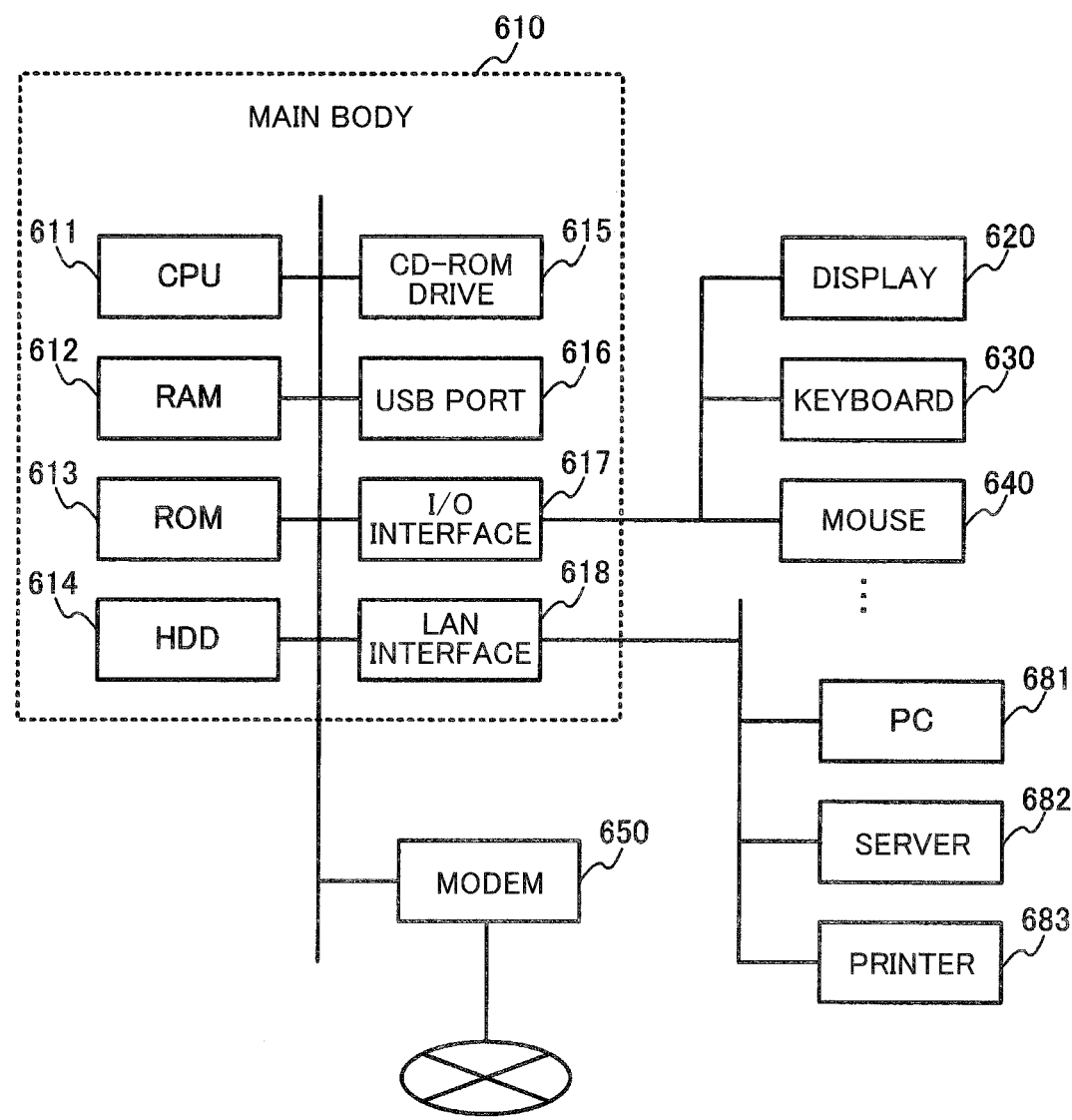
FIG. 21 shows a configuration example of a main body of a computer system.

FIG. 20 is a system configuration diagram showing the configuration of a computer system 600 according to this modification. FIG. 21 is a block diagram showing the configuration of a main body 610 of the computer system 600. As shown in FIG. 20, the computer system 600 includes the main body 610, a display 620 that displays information (e.g., image) on a display screen 621 based on instructions from the main body 610, a keyboard 630 that allows the user to input information to the computer system 600, and a mouse 640 that allows the user to designate an arbitrary position on the display screen 621 of the display 620.

As shown in FIG. 21, the main body 610 of the computer system 600 includes a CPU 611, a RAM 612, a ROM 613, a hard disk drive (HDD) 614, a CD-ROM drive 615 that receives a CD-ROM 660, a USB port 616 to which a USB memory 670 is removably connected, an I/O interface 617 that connects the display 620, the keyboard 630, and the mouse 640, and a LAN interface 618 that is used to connect to a local area network or a wide area network (LAN/WAN) N1.

The computer system 600 is connected to a modem 650 that is used to connect to a public line N3 (e.g., Internet). The computer system 600 is also connected to a personal computer (PC) 681 (i.e., another computer system), a server 682, a printer 683, and the like via the LAN interface 618 and the local area network or the large area network N1.

Figure 23:
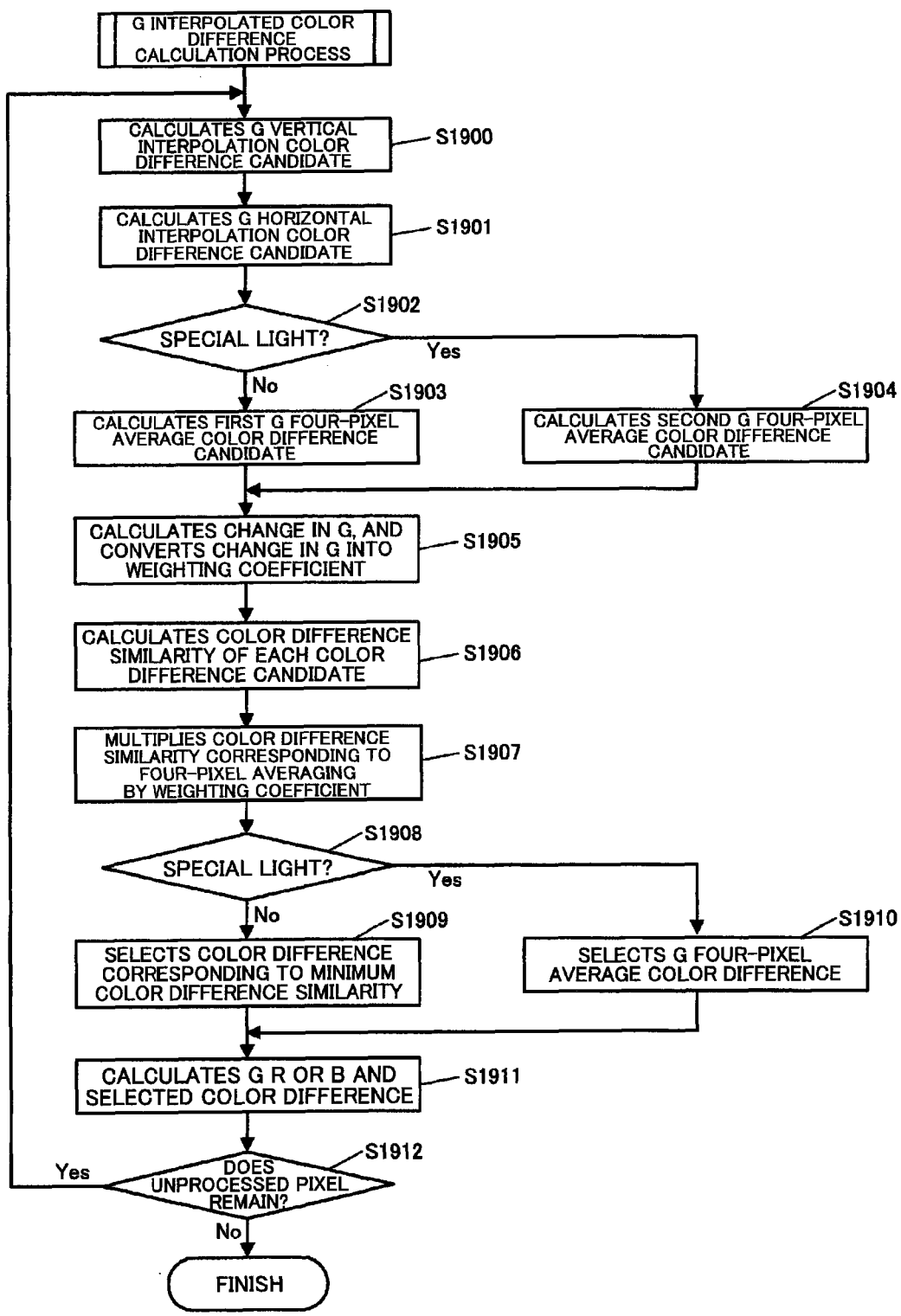
FIG. 23 is a flowchart showing a G interpolated color difference calculation process.
Figure 24:
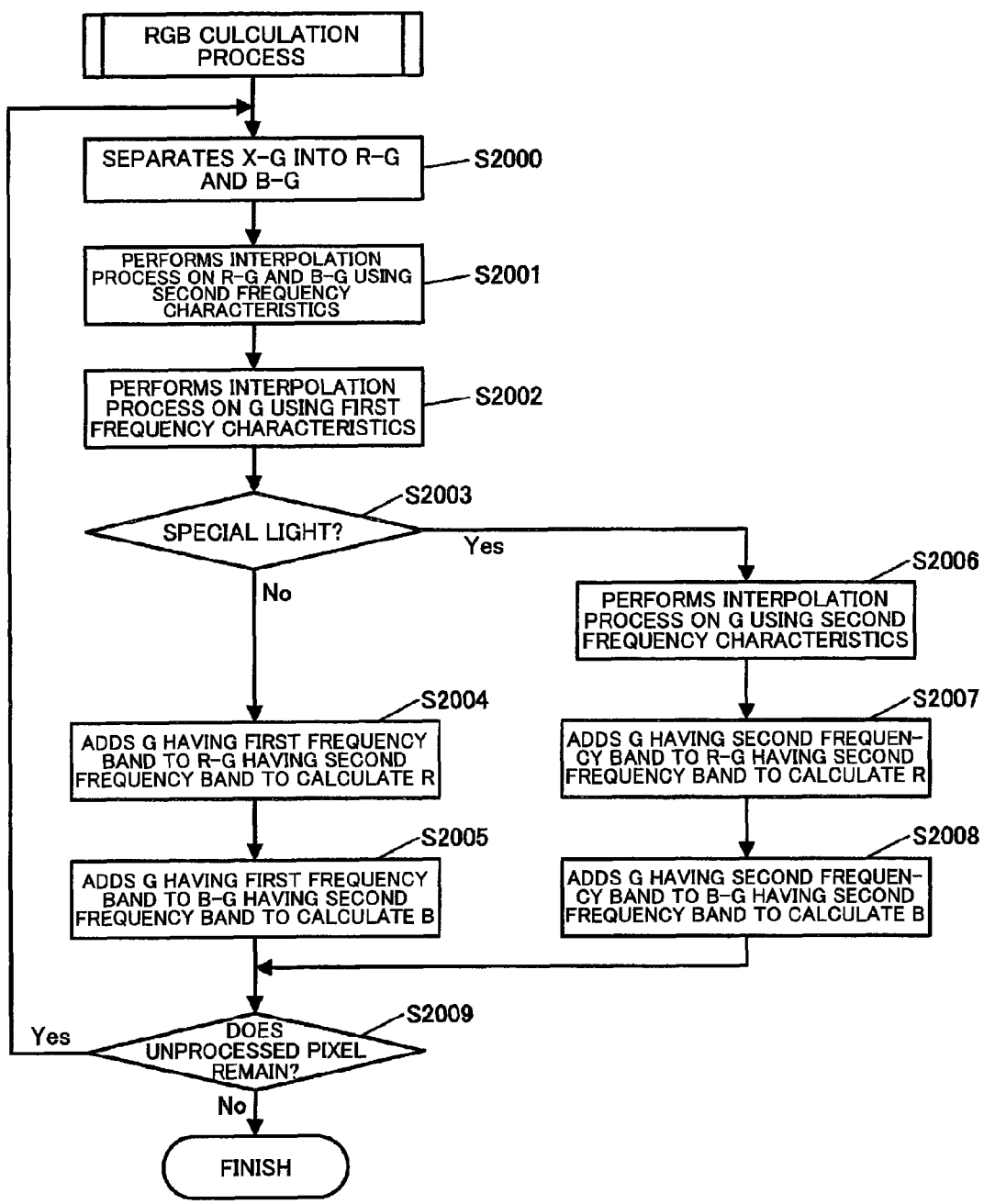
FIG. 24 is a flowchart showing a RGB calculation process.

The computer system 600 implements the functions of the image processing device by reading an image processing program (e.g., an image processing program that implements a process described later referring to FIGS. 22 to 24) recorded on a given recording medium, and executing the image processing program. The given recording medium may be an arbitrary recording medium that records the image processing program that can be read by the computer system 600, such as the CD-ROM 660, the USB memory 670, a portable physical medium (e.g., MO disk, DVD disk, flexible disk (FD), magnetooptical disk, or IC card), a stationary physical medium (e.g., HDD 614, RAM 612, or ROM 613) that is provided inside or outside the computer system 600, or a communication medium that temporarily stores a program during transmission (e.g., the public line N3 connected via the modem 650, or the local area network or the wide area network N1 to which the computer system (PC) 681 or the server 682 is connected).

Specifically, the image processing program is recorded on a recording medium (e.g., portable physical medium, stationary physical medium, or communication medium) so that the image processing program can be read by a computer. The computer system 600 implements the functions of the image processing device by reading the image processing program from such a recording medium, and executing the image processing program. Note that the image processing program need not necessarily be executed by the computer system 600. The invention may be similarly applied to the case where the computer system (PC) 681 or the server 682 executes the image processing program, or the computer system (PC) 681 and the server 682 execute the image processing program in cooperation.

A process performed when implementing the process of the image processing section 301 on an image acquired in advance by means of software is described below using a flowchart shown in FIG. 22 as an example of implementing part of the process of each section by means of software. The image acquired in advance is a Bayer array output image output from the A/D conversion section 205 and recorded on a recording medium as a RAW file, for example.

Figure 22:
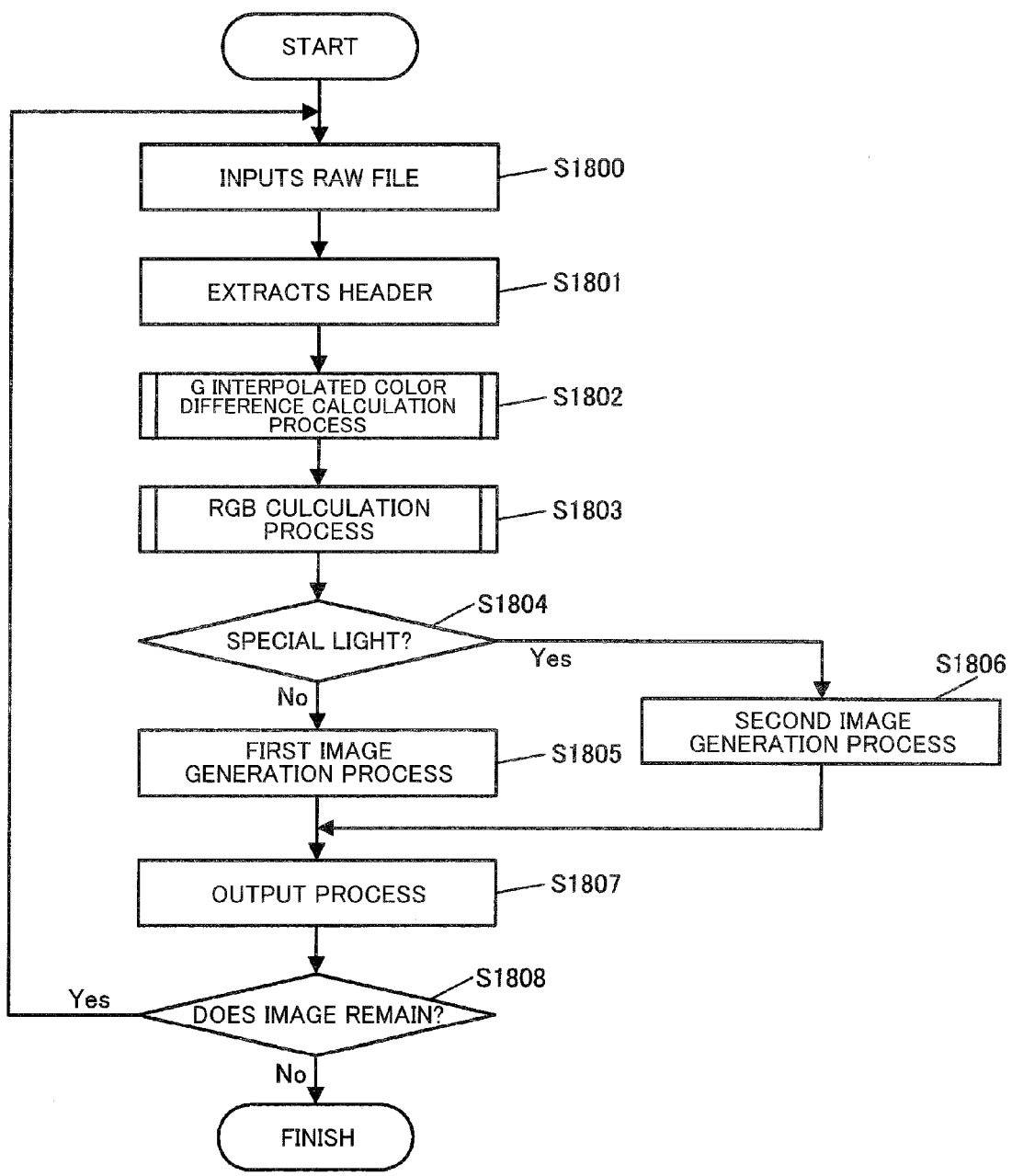
FIG. 22 is a flowchart showing a demosaicing process.

As shown in FIG. 22, a RAW file corresponding to the file name designated by the user is acquired (S1800). Header information about the acquired RAW file is extracted, and attribute information (e.g., size, grayscale level, color filter array information, illumination light determination information, photographing conditions, and color matrix coefficient) about the RAW file is acquired (S1801).

The interpolated pixel value of the signal G of the G-missing pixel is calculated based on the acquired attribute information, and the color difference of the G-missing pixel is calculated based on the interpolated pixel value (S1802). The RGB calculation process is performed based on the signal G and the color difference thus calculated, the signal G and the color difference at an identical pixel position are summed up, and the signal R and the signal B are generated (reproduced) (S1803).

Whether or not the illumination light setting information (i.e., attribute information) indicates special light is determined (S1804). When the illumination light setting information does not indicate special light, the signals R, G, and B are converted into a given color space (e.g., sRGB) by a color matrix process. The converted signals R, G, and B are converted into 8-bit signals Rγ, Gγ, and Bγ a gamma correction process, and the zoom/rotation process and the structure enhancement process are performed on the signals Rγ, Gγ, and Bγ (S1805).

When the illumination light setting information indicates special light, the signals R, G, and B are subjected to the pseudo-color conversion process. The converted signals R, G, and B subjected to the pseudo-color conversion process are converted into 8-bit signals Rγ, Gγ, and Bγ a gamma correction process, and the zoom/rotation process and the structure enhancement process are performed on the signals Rγ, Gγ, and Bγ (S1806).

The signals Rγ, Gγ, and Bγ subjected to the zoom/rotation process and the structure enhancement process are converted into YUV signals, compressed (e.g., JPEG), and stored as a developed image file (S1807). Whether or not the RAW file for which the user designated the file name remains is determined (S1808). When the RAW file remains, the process from the step S1800 is repeated. When the RAW file does not remain, the process is terminated.

The G interpolated color difference calculation process (S1802) is described in detail below using a flowchart shown in FIG. 23.

The vertical interpolated pixel value Gv of the G-missing pixel is calculated using the signals G adjacent to the G-missing pixel in the vertical direction based on the RAW file acquired in the step S1800 and the attribute information acquired in the step S1801. The color difference X−Gv is also calculated from the signal X at the same position as the G-missing pixel and the calculated vertical interpolated pixel value Gv. The vertical interpolated pixel value Gv and the color difference X−Gv are stored in the memory (S1900). Likewise, the horizontal interpolated pixel value Gh is calculated using the signals G adjacent to the G-missing pixel in the horizontal direction. The color difference X−Gh is then calculated, and the horizontal interpolated pixel value Gh and the color difference X−Gh are stored in the memory (S1901).

Whether or not the illumination light setting information (i.e., attribute information) acquired in the step S1801 indicates special light is determined (S1902). When the illumination light setting information does not indicate special light, the four-pixel average pixel value Ga is calculated using the signals G adjacent to the G-missing pixel in the vertical direction and the horizontal direction. The signal XL (high-frequency component has been cut) is calculated as the signal X at the same position as the G-missing pixel using the peripheral signal X of the G-missing pixel, and the color difference XL−Ga is calculated from the signal XL and the four-pixel average pixel value Ga. The four-pixel average pixel value Ga and the color difference XL−Ga are stored in the memory (S1903).

When the illumination light setting information indicates special light, the four-pixel average pixel value Ga is calculated using the signals G adjacent to the G-missing pixel in the vertical direction and the horizontal direction. The color difference X−Ga is calculated from the signal X at the same position as the G-missing pixel and the calculated four-pixel average pixel value Ga. The four-pixel average pixel value Ga and the color difference X−Ga are stored in the memory (S1904).

An activity in the signal G that defines an activity in the signal G by the sum of the absolute values is calculated using the peripheral signal G of the G-missing pixel. An activity in the signal G is converted into the weighting coefficient w (see FIG. 17 and the like), and the weighting coefficient w is stored in the memory (S1905).

The color difference similarities Sv, Sh, and Sa corresponding to the color difference candidates X−Gv, X−Gh, and XL−Ga (X−Ga) calculated in the steps S1900 to S1904 are calculated (S1906). The color difference similarity Sa calculated by interpolation that is appropriate for the signal G in the flat area (four-pixel averaging interpolation that is independent of direction) is multiplied by the weight w at the same pixel position to calculate a new color difference similarity w×Sa (S1907).

Whether or not the illumination light setting information indicates special light is determined (S1908). When the illumination light setting information does not indicate special light, the color difference at which one of the calculated color difference similarities Sv, Sh, and w×Sa is a minimum is selected (S1909). When the illumination light setting information indicates special light, the four-pixel average color difference X−Ga that is the color difference type of the color difference similarity w×Sa is selected (S1910). The selected color difference is added to the signal R or the signal B at the pixel position of the color difference to calculate the signal G (S1911).

Whether or not all of the G-missing pixels have been processed is determined (S1912). When all of the G-missing pixels have not been processed, the G interpolated color difference calculation process is repeated from the step S1900. When all of the G-missing pixels have been processed, the G interpolated color difference calculation process is terminated.

The RGB calculation process (step S1803 in FIG. 22) is described in detail below using a flowchart shown in FIG. 24.

The signal X–G calculated in the step S1802 is separated into the signal R–G and the signal B–G, and the signal R–G and the signal B–G are stored in the memory (S2000). A given region of the signal R–G stored in the memory is extracted, and the interpolated signal R–G is calculated using an interpolation filter (e.g., 8×8 tap filter) having the second frequency characteristics (see B2 in FIG. 19). Likewise, the interpolated signal B–G is calculated (S2001).

A given region of the signal G stored in the memory is extracted, and the interpolated signal G is calculated using an interpolation filter (e.g., 8×8 tap filter) having the first frequency characteristics (see B1 in FIG. 19).

Whether or not the illumination light setting information (i.e., attribute information) acquired in the step S1801 indicates special light is determined (S2003). When the illumination light setting information does not indicate special light, the signal G having the first frequency band is added to the signal R–G having the second frequency band to generate the signal R having the first frequency band (S2004). The signal G having the first frequency band is added to the signal B–G having the second frequency band to generate the signal B having the first frequency band (S2005).

When the illumination light setting information indicates special light, a given region of the signal G stored in the memory is extracted, and the interpolated signal G is calculated using an interpolation filter (e.g., 8×8 tap filter) having the second frequency characteristics (see B2 in FIG. 19) (S2006). The signal G having the second frequency band is added to the signal R–G having the second frequency band to generate the signal R having the second frequency band (S2007). The signal G having the second frequency band is added to the signal B–G having the second frequency band to generate the signal B having the second frequency band (S2008).

Whether or not all of the interpolation pixels have been processed is determined (S2009). When all of the interpolation pixels have not been processed, the demosaicing process is repeated from the step S2000. When all of the interpolation pixels have been processed, the demosaicing process is terminated.

In this embodiment, the RGB signals are calculated by the demosaicing process that does not utilize the color correlation when the illumination light setting information indicates special light, and are calculated by the demosaicing process that utilizes the color correlation when the illumination light setting information indicates white light, as described above.

9. Method According to this Embodiment

The method according to this embodiment that has been described in detail above is summarized below. An endoscope system that acquires a white light image having a high color correlation and a special image having a low color correlation has a problem in that an artifact occurs due to the demosaicing process on the special light image when the demosaicing process based on a high color correlation is always performed. On the other hand, a sufficient resolution cannot be obtained by the demosaicing process on the white light when the demosaicing process that does not utilize the color correlation is always performed.

According to this embodiment, the demosaicing section 702 (demosaicing means) receives an image (mosaic image) formed by first to third color signals R, G, and B, and interpolates (demosaicing process) the missing color signal of each pixel of the image among the first color signal, the second color signal, and the third color signal R, G, and B. The image output section 707 (image output means) outputs the output image based on the image (signals RQ, GQ, and BQ) obtained by the interpolation process performed by the demosaicing section 702. The demosaicing section 702 performs the space-variant interpolation process (i.e., a different interpolation process is performed depending on the pixel position) on a first image (white light image) that has information within a first wavelength band. The demosaicing section 702 performs the space-invariant interpolation process (i.e., an interpolation process is performed independently of the pixel position) on a second image (special light image) that has information within a second wavelength band.

This makes it possible to switch the interpolation process depending on the image (illumination light). Specifically, the interpolation process utilizing the color correlation can be performed on the first image by performing the space-variant interpolation process. Specifically, the interpolation process utilizing the fact that the signal G and the signal R have an edge at the same position in the same direction and the signal G and the signal B have an edge at the same position in the same direction can be performed. The resolution can thus be improved when performing the interpolation process on the first image. On the other hand, the interpolation process that does not utilize the color correlation can be performed on the second image by performing the space-invariant interpolation process. Specifically, the interpolation process that does not take account of the edge component of the signal G can be performed. Therefore, occurrence of an artifact due to the demosaicing process can be suppressed when performing the interpolation process on the second image.

The first image that has information within the first wavelength band is an image acquired by applying illumination light having the first wavelength band to an observation area of a tissue, and imaging the observation area, for example. The second image that has information within the second wavelength band is an image acquired by applying illumination light having the second wavelength band to an observation area of a tissue, and imaging the observation area, for example.

In this embodiment, the first image is an image (white light image) that has information within the wavelength band of white light (normal light) as the information within the first wavelength band, and the second image is an image (special light image) that has information within a specific wavelength band as the information within the second wavelength band.

Therefore, since identical blood vessel images (in vivo image) are acquired using the RGB signals, the space-variant interpolation process can be performed on the white light image having a high color correlation. On the other hand, since different RGB blood vessel images are acquired using the signal G and the signal B, the space-invariant interpolation process can be performed on the special light image having a low color correlation.

In this embodiment, the image input to the demosaicing section 702 is a mosaic image in which pixels of respective color signals are arranged at different pixel positions (Bayer array), and the pixels of the first color signal G are arranged at a high density as compared with the pixels of the second and third color signals R and B.

Therefore, a high-resolution demosaicing process can be performed by the space-variant interpolation process. Specifically, a high-resolution interpolation process can be performed by performing the interpolation process on the low-density signals R and B using a high-frequency component of the high-density signal G.

In this embodiment, the interpolation G calculation sections 1203 to 1205 (interpolated pixel value calculation section 10) calculate the interpolated pixel values Gv, Gh, and Ga (i.e., a plurality of interpolated signal Gs) of the first color signal G at the interpolation target pixel (G-missing pixel) at which the first color signal G is missing. The color difference calculation sections 1207 to 1209 (color difference calculation section 20) calculate the color differences X−Gv, X−Gh, and X−Ga that are color differences between the interpolated pixel values Gv, Gh, and Ga and the pixel value of the second color signal R or the third color signal B. The color difference selection section 1220 (color difference output section 40) selects one of the color differences X−Gv, X−Gh, and X−Ga when performing the space-variant interpolation process, and outputs the specific color difference X−Ga when performing the space-invariant interpolation process.

Therefore, a different interpolation process can be performed on each G-missing pixel by selecting one of the color differences X−Gv, X−Gh, and X−Ga. An interpolation process independent of the position of the G-missing pixel can be performed by outputting the specific color difference X−Ga.

More specifically, the vertical interpolated G calculation section 1203 calculates the vertical interpolated pixel value Gv (vertical interpolated signal G) based on the pixel values of the first color signal G of the pixels adjacent to the interpolation target pixel (G-missing pixel) in the vertical direction. The horizontal interpolated G calculation section 1204 calculates the horizontal interpolated pixel value Gh (horizontal interpolated signal G) based on the pixel values of the first color signal G of the pixels adjacent to the interpolation target pixel in the horizontal direction. The four-pixel average G calculation section 1205 calculates the four-pixel average pixel value Ga (four-pixel average signal G) based on the pixel values of the first color signal G of the pixels adjacent to the interpolation target pixel in the vertical direction and the horizontal direction. The vertical color difference calculation section 1207 calculates the vertical interpolated color difference X−Gv that is the differential value between the pixel value X of the second color signal R or the third color signal B and the vertical interpolated pixel value Gv. The horizontal color difference calculation section 1208 calculates the horizontal interpolated color difference X−Gh that is the differential value between the pixel value X and the horizontal interpolated pixel value Gh. The four-pixel average color difference calculation section 1209 calculates the four-pixel average color difference X−Ga that is the differential value between the pixel value X and the four-pixel average pixel value Ga.

Therefore, the vertical interpolated pixel value Gv corresponding to the edge in the vertical direction, the horizontal interpolated pixel value Gh corresponding to the edge in the horizontal direction, and the four-pixel average pixel value Ga corresponding to the flat area and the edge in the diagonal direction can be calculated as a plurality of interpolated signal Gs. An interpolation process corresponding to the edge direction can be performed by selecting one of the color differences X−Gv, X−Gh or X−Ga. An interpolation process independent of the edge direction can be performed by outputting the color difference X−Ga as the specific color difference.

In this embodiment, the low-pass filter 1206 (color difference calculation section 20) performs the low-pass filtering process on the second color signal R and the low-pass filtering process on the third color signal B. When performing the space-variant interpolation process, the four-pixel average color difference calculation section 1209 (color difference calculation section 20) calculates the differential value XL−Ga between the second color signal RL or the third color signal BL obtained by the low-pass filtering process and the four-pixel average pixel value Ga.

Therefore, the signal G interpolation process utilizing the color correlation can be performed when performing the space-variant interpolation process. Specifically, when the color difference XL−Ga has been selected, the signal G output section 1221 can output the signal Ga to which a high-frequency component of the signal X is added.

In this embodiment, the color difference similarity calculation sections 1213 to 1215 (color difference similarity calculation section 30) calculate the color difference similarities Sv, Sh, and Sa corresponding to the color differences Gv, Gh, and Ga. The color difference similarity calculation section 1213 to 1215 calculate the color difference differential value between the interpolation target pixels (G-missing pixels), calculate the absolute value of the differential value, and calculate the sum of the absolute values within a given area including the interpolation target pixels (e.g., the area shown in FIG. 16A) to calculate the color difference similarity. The color difference selection section 1220 (color difference output section 40) selects the color difference corresponding to the minimum color difference similarity among the color difference similarities Sv, Sh, and Sa when performing the space-variant interpolation process.

Therefore, the color difference can be selected based on the color difference similarity when performing the space-variant interpolation process by selecting the color difference corresponding to the minimum color difference similarity.

More specifically, the vertical color difference similarity calculation section 1213 calculates the vertical color difference similarity Sv from the differential value between the vertical interpolated color differences X−Gv in the vertical direction. The horizontal color difference similarity calculation section 1214 calculates the horizontal color difference similarity from the differential value between the horizontal interpolated color differences X−Gh in the horizontal direction. The four-pixel average similarity calculation section 1215 calculates the four-pixel average similarity Sa from the differential value between the four-pixel average color differences X−Ga (XL−Ga) in the vertical direction, the differential value between the four-pixel average color differences X−Ga (XL−Ga) in the horizontal direction, and the differential value between the four-pixel average color differences X−Ga (XL−Ga) in the diagonal direction.

Therefore, the color difference can be selected based on the edge direction by selecting the color difference corresponding to the minimum color difference similarity. Specifically, the edge direction can be determined by utilizing the fact that the color difference differential value decreases along the edge direction. Moreover, the effects (e.g., the intensity decreases due to the demosaicing process) of the offset between the color signals (e.g., the differential value between the RGB signals) can be suppressed by calculating the color difference differential value.

In this embodiment, the signal G output section 1221 (color difference output section 40) adds the output color difference X−G to the second or third color signal X corresponding to the interpolation target pixel (G-missing pixel), and outputs the resulting value as the output pixel value G. The signal G output section 1221 outputs the pixel value of the first color signal G of the input image as the output pixel value G corresponding to the pixel other than the interpolation target pixel. The interpolation section 1002 (interpolation section 50) calculates the pixel values of the RGB color signals of each pixel of the image based on the output color difference X–G and the output pixel value G. The interpolation section 1002 performs a first low-pass filtering process using a first cut-off frequency (NF) on the output pixel value G when performing the space-variant interpolation process, and performs a second low-pass filtering process using a second cut-off frequency (NF/2) on the output pixel value G when performing the space-invariant interpolation process.

In this embodiment, the interpolation section 1002 separates the output color difference X–G into the color differences R–G and B–G The interpolation section 1002 performs the second low-pass filtering process (NF/2) on the color differences R–G and B–G to calculate the color differences RL–GL and BL–GL of each pixel. When performing the space-variant interpolation process, the interpolation section 1002 adds the color differences RL–GL and BL–GL to the output pixel value GH after the first low-pass filtering process (NF) to calculate the pixel values RQ and BQ of each pixel. When performing the space-invariant interpolation process, the interpolation section 1002 adds the color differences RL–GL and BL–GL to the output pixel value GL after the second low-pass filtering process (NF/2) to calculate the pixel values RQ and BQ of each pixel.

This makes it possible to generate a color image in which the RGB signals are disposed in each pixel by performing the demosaicing process. Moreover, the edge component of the signal G can be added to the signal R and the signal B by performing the interpolation process utilizing the color correlation when performing the space-variant interpolation process. On the other hand, the signal R and the signal B to which the edge component of the signal G is not added can be output by performing the interpolation process that does not utilize the color correlation when performing the space-invariant interpolation process.

In this embodiment, the above specific wavelength band is narrower than the wavelength band of white light. Specifically, the first image and the second image are in vivo images, and the information about the specific wavelength band included in the in vivo images is information about the wavelength band of a wavelength absorbed by hemoglobin in blood. For example, the specific wavelength band absorbed by hemoglobin is 390 to 445 nm (i.e., B2) or 530 to 550 nm (i.e., G2).

This makes it possible to acquire a narrow-band light image (NBI image) as the special light image. A blood vessel image that differs depending on the narrow-band light (G2 and B2) may be acquired, and the interpolation process that does not utilize the color correlation may be performed on the narrow-band light image having a low color correlation. Moreover, it is possible to observe the structure of a surface area of a tissue and a blood vessel located in a deep area by acquiring the narrow-band light image. A lesion area (e.g., epidermoid cancer) that cannot be easily observed using normal light can be displayed as a brown area or the like in light by inputting the resulting signal to a given channel (R, G, and B), so that the lesion area can be reliably detected. A wavelength band of 390 to 445 nm or 530 to 550 nm is selected from the viewpoint of absorption by hemoglobin and the ability to reach a surface area or a deep area of a tissue. Note that the wavelength band is not limited thereto. For example, the lower limit of the wavelength band may decrease by about 0 to 10%, and the upper limit of the wavelength band may increase by about 0 to 10% depending on a variation factor (e.g., experimental results for absorption by hemoglobin and the ability to reach a surface area or a deep area of a tissue).

In this embodiment, the endoscope system includes the light source section 100 that emits (applies) white light and light having a specific wavelength band to an in vivo object, the demosaicing section 702 that receives an image that includes the first color signal, the second color signal, and the third color signal, and performs an interpolation process that interpolates the missing color signal of each pixel of the image, the image output section 707 that outputs the output image based on the image obtained by the interpolation process, and the display section 400 that displays the output image.

An endoscope system that switches the interpolation process based on light applied to a tissue can thus be obtained. Specifically, the space-variant interpolation process can be performed on a first image obtained by applying white light, and the space-invariant interpolation process can be performed on a second image obtained by applying light having a specific wavelength band.

In this embodiment, a computer may be caused to function as the demosaicing section 702 that receives an image that includes the first color signal, the second color signal, and the third color signal, and performs an interpolation process that interpolates the missing color signal, and the image output section 707 that outputs the output image based on the image obtained by the interpolation process. The computer that functions as the demosaicing section 702 may perform the space-variant interpolation process on the first image that has information within the first wavelength band, and may perform the space-invariant interpolation process on the second image that has information within the second wavelength band.

This makes it possible to store image data, and process the stored image data by means of software using a computer system (e.g., PC) (e.g., capsule endoscope).

This embodiment may be applied to a computer program product that stores a program code that implements each section (e.g., interpolated pixel value calculation section, color difference calculation section, color difference output section, color difference similarity calculation section, demosaicing process, and image output section) according to this embodiment.

The program code implements a demosaicing section that receives an image that includes the first color signal, the second color signal, and the third color signal, and performs an interpolation process that interpolates the missing color signal (one of the first color signal, the second color signal, and the third color signal) of each pixel of the image, and an image output section that outputs an output image based on the image obtained by the interpolation process. The demosaicing section performs a space-variant interpolation process (i.e., a different interpolation process is performed depending on the pixel position) on a first image that has information within a first wavelength band, and performs a space-invariant interpolation process (i.e., an interpolation process is performed independently of the pixel position) on a second image that has information within a second wavelength band.

The term "computer program product" refers to an information storage medium, a device, an instrument, a system, or the like that stores a program code, such as an information storage medium (e.g., optical disk medium (e.g., DVD), hard disk medium, and memory medium) that stores a program code, a computer that stores a program code, or an Internet system (e.g., a system including a server and a client terminal), for example. In this case, each element and each process according to this embodiment are implemented by corresponding modules, and a program code that includes these modules is recorded in the computer program product.

10. Modification of G Interpolated Color Difference Calculation Section

The above configuration examples illustrates a case where the G interpolated color difference calculation section 1001 calculates the color differences X–Gv, X–Gh, and X–Ga, and then selects the color difference. Note that the G interpolated color difference calculation section 1001 may determine the signal G interpolation method, and then calculate the color difference.

Figure 25:
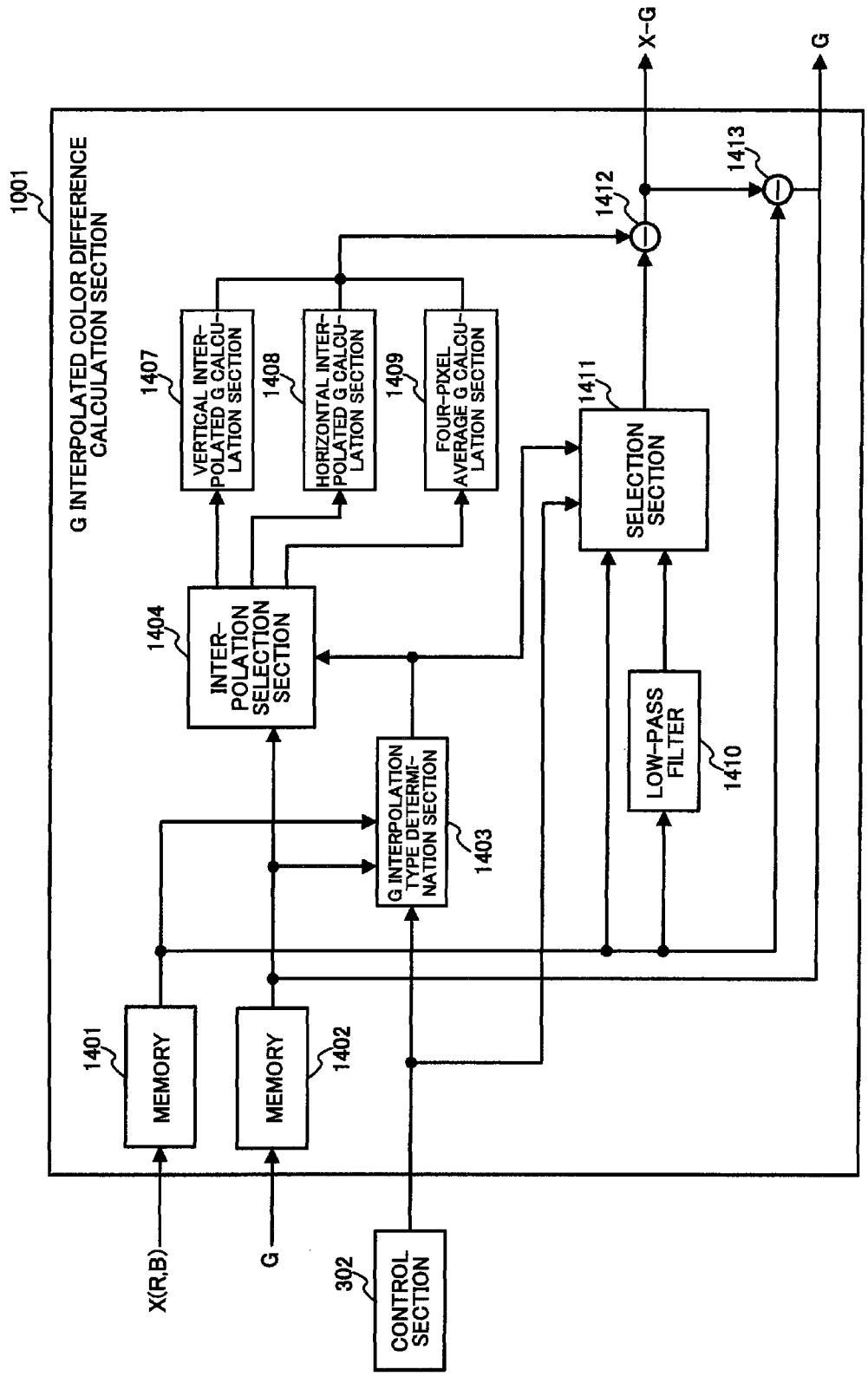
FIG. 25 shows a modification of a G interpolated color difference calculation section.

FIG. 25 shows the G interpolated color difference calculation section 1001 according to this modification. The G interpolated color difference calculation section 1001 shown in FIG. 25 includes memories 1401 and 1402, a G interpolation type determination section 1403 (calculating method setting section), an interpolation selection section 1404, a vertical interpolated G calculation section 1407, a horizontal interpolated G calculation section 1408, a four-pixel average G calculation section 1409, a low-pass filter 1410, a selection section 1411, a color difference calculation section 1412 (subtractor), and a signal G output section 1413 (subtractor).

The memory 1401 stores the signal X (signal R and signal B) of the Bayer array digital image input to the G interpolated color difference calculation section 1001. The memory 1402 stores the signal G.

The G interpolation type determination section 1403 determines the interpolation type (interpolation method) of the G-missing pixel based on the signal X output from the memory 1401 and the signal G output from the memory 1402, and outputs interpolation type information corresponding to the determined interpolation type. Specifically, the G interpolation type determination section 1403 calculates the absolute value of the differential value between the signals G of the pixels adjacent to the G-missing pixel in the vertical direction (correlation value in the vertical direction) and the absolute value of the differential value between the signals G of the pixels adjacent to the G-missing pixel in the horizontal direction (correlation value in the horizontal direction). The G interpolation type determination section 1403 determines the interpolation type based on the quantitative relationship between the correlation value in the vertical direction and the correlation value in the horizontal direction. The correlation value along the edge direction is smaller than the correlation value that intersects the edge direction. The G interpolation type determination section 1403 designates horizontal interpolation when the differential value between the correlation value in the vertical direction and the correlation value in the horizontal direction is larger than a given threshold value, designates vertical interpolation when the differential value between the correlation value in the vertical direction and the correlation value in the horizontal direction is smaller than the given threshold value, and designates four-pixel averaging when the differential value between the correlation value in the vertical direction and the correlation value in the horizontal direction is equal to or smaller than the given threshold value.

The interpolation selection section 1404 selects the interpolation type designated by the interpolation type information output from the G interpolation type determination section 1403. Specifically, the interpolation selection section 1404 outputs the signal G to one of the vertical interpolated G calculation section 1407, the horizontal interpolated G calculation section 1408, and the four-pixel average G calculation section 1409 corresponding to the interpolation type information.

The vertical interpolated G calculation section 1407 calculates the signal Gv of the G-missing pixel using the signals G of the pixels adjacent to the G-missing pixel in the vertical direction when vertical interpolation has been selected.

The horizontal interpolated G calculation section 1408 calculates the signal Gh of the G-missing pixel using the signals G of the pixels adjacent to the G-missing pixel in the horizontal direction when horizontal interpolation has been selected.

The four-pixel average G calculation section 1409 calculates the signal Ga of the O-missing pixel using the signals G of the pixels adjacent to the G-missing pixel in the vertical direction and the horizontal direction when four-pixel averaging has been selected.

The low-pass filter 1410 performs a band-limiting process on the signal X stored in the memory 1401 using the same type of signals X included in the peripheral area (e.g., 5×5 pixel area) of the signal X stored in the memory 1401, and outputs the signal XL obtained by the band-limiting process.

The selection section 1411 outputs the signal X output from the memory 1401 when the illumination light setting information L output from the control section 302 indicates white light (L=1), and outputs the signal XL output from the low-pass filter 1410 when the illumination light setting information L output from the control section 302 indicates special light (L=0).

The color difference calculation section 1412 subtracts the selected interpolated signal G (Gv, Gh, or Ga) from the signal X (signal XL) output from the selection section 1411 to calculate the color difference X–G.

The signal G output section 1413 subtracts the color difference X–G output from the color difference output section 1412 from the signal X output from the memory 1401 to calculate the signal G of the G-missing pixel. The signal G output section 1413 outputs the signal G output from the memory 1402 as the signal G of pixels other than the G-missing pixel.

According to this modification, the signal G is interpolated after determining the interpolation type. According to this modification, the interpolation process is switched as described below depending on illumination light.

When the illumination light setting information L indicates white light (L=1), the mode is set to the color correlation utilization mode. In the color correlation utilization mode, the G interpolation type determination section 1403 determines the interpolation type of the G-missing pixel, and outputs the interpolation type information corresponding to vertical interpolation, horizontal interpolation, or four-pixel averaging. Specifically, a different interpolation process is performed depending on the pixel position. When the G interpolation type determination section 1403 has determined that the interpolation type is four-pixel averaging, the selection section 1411 selects the signal XL output from the low-pass filter 1410. The color difference output section 1412 calculates the difference between the color difference XL–Ga and the signal X (i.e., X–(XL–Ga)=Ga+(X–XL)=Ga+ΔX). Specifically, ΔX (i.e., a high-frequency component of the signal X) is added to the signal Ga (i.e., low-frequency component). Specifically, the interpolation process is performed using the correlation between the signal R and the signal G or the correlation between the signal B and the signal G when the illumination light setting information L indicates white light.

When the illumination light setting information L indicates special light (L=0), the mode is set to the color correlation non-utilization mode. In the color correlation non-utilization mode, the G interpolation type determination section 1403 necessarily outputs the interpolation type information corresponding to four-pixel averaging. Specifically, an interpolation process is performed independently of the pixel position. The selection section 1411 selects the signal X output from the memory 1401. The color difference output section 1412 calculates the difference between the four-pixel average color difference X−Ga and the signal X (i.e., X−(X−Ga)=Ga). Specifically, a high-frequency component of the signal X is not added to the signal Ga. When the illumination light setting information L indicates special light, the interpolation process that does not utilize the color correlation is performed in this manner.

According to this modification, the G interpolation type determination section 1403 (determination section) determines the method of calculating the first color signal G interpolated pixel value of the interpolation target pixel based on the first color signals G of the pixels adjacent to the interpolation target pixel (G-missing pixel) in which the first color signal G is missing. The interpolation G calculation sections 1407 to 1409 (interpolated pixel value calculation section) calculate the interpolated pixel value (Gv, Gh or Ga) by one of the calculation methods (vertical interpolation, horizontal interpolation, and four-pixel averaging). The color difference output section 1412 outputs the differential value between the second color signal R or the third color signal B of the interpolation target pixel and the interpolated pixel value output from the interpolation G calculation sections 1407 to 1409 (interpolated pixel value calculation section) as the color difference X−G. When performing the space-variant interpolation process, the interpolation G calculation sections 1407 to 1409 (interpolated pixel value calculation section) calculate the interpolated pixel value by the calculation method determined by the G interpolation type determination section 1403. When performing the space-invariant interpolation process, the four-pixel average G calculation section 1409 (interpolated pixel value calculation section) calculates the interpolated pixel value Ga by the specific calculation method (four-pixel averaging) among the plurality of calculation methods.

Therefore, the interpolation process utilizing the color correlation can be performed by performing the space-variant interpolation process, so that a high-resolution demosaicing process can be performed. The interpolation process that does not utilize the color correlation can be performed by performing the space-invariant interpolation process, so that a situation in which an artifact occurs due to the demosaicing process performed on an image having a low color correlation that has been imaged using special light, can be avoided.

The embodiments according to the invention and the modifications thereof have been described above. Note that the invention is not limited to the above embodiments and the modifications thereof. Various modifications and variations may be made without departing from the scope of the invention. A plurality of elements of the above embodiments and the modifications thereof may be appropriately combined. For example, some elements may be omitted from the elements of the above embodiments and the modifications thereof. The elements described in connection with the above embodiments and the modifications thereof may be appropriately combined. Specifically, various modifications and applications are possible without materially departing from the novel teachings and advantages of the invention.

Any term (e.g., white light image and special light image) cited with a different term (e.g., first image and second image) having a broader meaning or the same meaning at least once in the specification and the drawings may be replaced by the different term in any place in the specification and the drawings.

What is claimed is:

1. An image processing device comprising:
   a demosaicing section that receives an image that includes a first color signal, a second color signal, and a third color signal, and performs an interpolation process that interpolates a missing color signal among the first color signal, the second color signal, and the third color signal on each pixel of the image; and
   an image output section that outputs an output image based on an image obtained by the interpolation process and output from the demosaicing section,
   the demosaicing section performing a space-variant interpolation process that implements an interpolation process depending on a pixel position on a first image that has information within a first wavelength band, and
   the demosaicing section performing a space-invariant interpolation process that implements an interpolation process independently of a pixel position on a second image that has information within a second wavelength band.

2. The image processing device as defined in claim 1,
   the first image being an image that has information within a wavelength band of white light as the information within the first wavelength band, and
   the second image being an image that has information within a specific wavelength band as the information within the second wavelength band.

3. The image processing device as defined in claim 1,
   the image that includes the first color signal, the second color signal, and the third color signal being a mosaic image in which pixels of respective color signals are arranged at different pixel positions, and
   pixels of the first color signal being arranged at a high density as compared with pixels of the second color signal and the third color signal.

4. The image processing device as defined in claim 1,
   the demosaicing section including:
   an interpolated pixel value calculation section that calculates a plurality of interpolated pixel values of the first color signal of an interpolation target pixel in which the first color signal is missing;
   a color difference calculation section that calculates a plurality of color differences between the plurality of interpolated pixel values and a pixel value of the second color signal or the third color signal; and
   a color difference selection section,
   the color difference selection section selecting one of the plurality of color differences when performing the space-variant interpolation process, and
   the color difference selection section outputting a specific color difference among the plurality of color differences when performing the space-invariant interpolation process.

5. The image processing device as defined in claim 4,
   the interpolated pixel value calculation section calculating a vertical interpolated pixel value, a horizontal interpolated pixel value, and a four-pixel average pixel value, as the plurality of interpolated pixel values,
   the vertical interpolated pixel value being based on pixel values of the first color signal of pixels adjacent to the interpolation target pixel in a vertical direction,
   the horizontal interpolated pixel value being based on pixel values of the first color signal of pixels adjacent to the interpolation target pixel in a horizontal direction, the four-pixel average pixel value being based on pixel values of the first color signal of pixels adjacent to the interpolation target pixel in the vertical direction and the horizontal direction, the color difference calculation section calculating a vertical interpolated color difference, a horizontal interpolated color difference, and a four-pixel average color difference, as the plurality of color differences, the vertical interpolated color difference being a differential value between a pixel value of the second color signal or the third color signal and the vertical interpolated pixel value, the horizontal interpolated color difference being a differential value between a pixel value of the second color signal or the third color signal and the horizontal interpolated pixel value, the four-pixel average color difference being a differential value between a pixel value of the second color signal or the third color signal and the four-pixel average pixel value, the color difference selection section selecting the vertical interpolated color difference, the horizontal interpolated color difference, or the four-pixel average color difference when performing the space-variant interpolation process, and the color difference selection section outputting the four-pixel average color difference as the specific color difference when performing the space-invariant interpolation process.

6. The image processing device as defined in claim 5, the color difference calculation section including a low-pass filter that performs a low-pass filtering process on the second color signal and a low-pass filtering process on the third color signal, and the color difference calculation section calculating a differential value between a second color signal obtained by the low-pass filtering process and the four-pixel average pixel value, or a differential value between a third color signal obtained by the low-pass filtering process and the four-pixel average pixel value, as the four-pixel average color difference when performing the space-variant interpolation process.

7. The image processing device as defined in claim 4, the demosaicing section including a color difference similarity calculation section that calculates a plurality of color difference similarities corresponding to the plurality of color differences, the color difference similarity calculation section calculating a color difference differential value between the interpolation target pixels, calculating an absolute value of the color difference differential value, and calculating the sum of the absolute values within a given area including the interpolation target pixels to calculate the color difference similarity, the color difference selection section selecting a color difference corresponding to a minimum color difference similarity among the plurality of color difference similarities when performing the space-variant interpolation process, and the color difference selection section outputting the specific color difference among the plurality of color differences when performing the space-invariant interpolation process.

8. The image processing device as defined in claim 7, the interpolated pixel value calculation section calculating a vertical interpolated pixel value, a horizontal interpolated pixel value, and a four-pixel average pixel value, as the plurality of interpolated pixel values, the vertical interpolated pixel value being based on pixel values of the first color signal of pixels adjacent to the interpolation target pixel in a vertical direction, the horizontal interpolated pixel value being based on pixel values of the first color signal of pixels adjacent to the interpolation target pixel in a horizontal direction, the four-pixel average pixel value being based on pixel values of the first color signal of pixels adjacent to the interpolation target pixel in the vertical direction and the horizontal direction, the color difference calculation section calculating a vertical interpolated color difference, a horizontal interpolated color difference, and a four-pixel average color difference, as the plurality of color differences, the vertical interpolated color difference being a differential value between a pixel value of the second color signal or the third color signal and the vertical interpolated pixel value, the horizontal interpolated color difference being a differential value between a pixel value of the second color signal or the third color signal and the horizontal interpolated pixel value, the four-pixel average color difference being a differential value between a pixel value of the second color signal or the third color signal and the four-pixel average pixel value, the color difference similarity calculation section calculating a vertical color difference similarity based on a differential value between the vertical interpolated color differences in the vertical direction, the color difference similarity calculation section calculating a horizontal color difference similarity based on a differential value between the horizontal interpolated color differences in the horizontal direction, the color difference similarity calculation section calculating a four-pixel average similarity based on a differential value between the four-pixel average color differences in the vertical direction, a differential value between the four-pixel average color differences in the horizontal direction, and a differential value between the four-pixel average color differences in a diagonal direction, the color difference selection section selecting a color difference corresponding to a minimum color difference similarity among the vertical color difference similarity, the horizontal color difference similarity, and the four-pixel average similarity when performing the space-variant interpolation process, and the color difference selection section outputting the four-pixel average color difference as the specific color difference when performing the space-invariant interpolation process.

9. The image processing device as defined in claim 4, the color difference selection section adding an output color difference that is the selected color difference to the second color signal or the third color signal, and outputting the resulting value as an output pixel value of the first color signal corresponding to the interpolation target pixel, the color difference selection section outputting a pixel value of the first color signal of the image input to the demosaicing section as the output pixel value corresponding to a pixel other than the interpolation target pixel, the demosaicing section including an interpolation section that calculates the pixel values of the first color signal, the second color signal, and the third color signal of each pixel of the image based on the output color difference and the output pixel value output from the color difference selection section, the interpolation section performing a first low-pass filtering process using a first cut-off frequency on the output pixel value when performing the space-variant interpolation process, and the interpolation section performing a second low-pass filtering process using a second cut-off frequency lower than the first cut-off frequency on the output pixel value when performing the space-invariant interpolation process.

10. The image processing device as defined in claim 9, the interpolation section separating the output color difference into an output color difference of the second color signal and an output color difference of the third color signal, the interpolation section performing the second low-pass filtering process on the output color difference of the second color signal to calculate the color difference of the second color signal of each pixel, and performing the second low-pass filtering process on the output color difference of the third color signal to calculate the color difference of the third color signal of each pixel, the interpolation section adding the color difference of the second color signal of each pixel to the output pixel value obtained by the first low-pass filtering process to calculate the pixel value of the second color signal of each pixel, and adding the color difference of the third color signal of each pixel to the output pixel value obtained by the first low-pass filtering process to calculate the pixel value of the third color signal of each pixel when performing the space-variant interpolation process, and the interpolation section adding the color difference of the second color signal of each pixel to the output pixel value obtained by the second low-pass filtering process to calculate the pixel value of the second color signal of each pixel, and adding the color difference of the third color signal of each pixel to the output pixel value obtained by the second low-pass filtering process to calculate the pixel value of the third color signal of each pixel when performing the space-invariant interpolation process.

11. The image processing device as defined in claim 1, the demosaicing section including:

a determination section that determines a calculation method that calculates an interpolated pixel value of the first color signal of the interpolation target pixel based on the first color signals of pixels adjacent to the interpolation target pixel in which the first color signal is missing;

an interpolated pixel value calculation section that calculates the interpolated pixel value by one of a plurality of calculation methods; and a color difference output section that outputs a differential value between the second color signal or the third color signal of the interpolation target pixel and the interpolated pixel value output from the interpolated pixel value calculation section as the color difference, the interpolated pixel value calculation section calculating the interpolated pixel value by the calculation method determined by the determination section when performing the space-variant interpolation process, and the interpolated pixel value calculation section calculating the interpolated pixel value by a specific calculation method among the plurality of calculation methods when performing the space-invariant interpolation process.

12. The image processing device as defined in claim 2, the specific wavelength band being narrower than a wavelength band of the white light.

13. The image processing device as defined in claim 12, the first image and the second image being in vivo images; and the specific wavelength band included in the in vivo images being a wavelength band absorbed by hemoglobin in blood.

14. The image processing device as defined in claim 13, the specific wavelength band being 390 to 445 nm or 530 to 550 nm.

15. An endoscope system comprising:

a light source section that applies white light and light having a specific wavelength band to an in vivo object;

a demosaicing section that receives an image that includes a first color signal, a second color signal, and a third color signal, and performs an interpolation process that interpolates a missing color signal among the first color signal, the second color signal, and the third color signal on each pixel of the image;

an image output section that outputs an output image based on an image obtained by the interpolation process and output from the demosaicing section; and a display section that displays the output image output from the image output section, the demosaicing section performing a space-variant interpolation process that implements an interpolation process depending on a pixel position on a first image that has information within a wavelength band of the white light, and the demosaicing section performing a space-invariant interpolation process that implements an interpolation process independently of a pixel position on a second image that has information within the specific wavelength band.

16. A program that is stored on an information recording medium, the program causing a computer to function as:

a demosaicing section that receives an image that includes a first color signal, a second color signal, and a third color signal, and performs an interpolation process that interpolates a missing color signal among the first color signal, the second color signal, and the third color signal on each pixel of the image; and an image output section that outputs an output image based on an image obtained by the interpolation process and output from the demosaicing section, the demosaicing section performing a space-variant interpolation process that implements an interpolation process depending on a pixel position on a first image that has information within a first wavelength band, and the demosaicing section performing a space-invariant interpolation process that implements an interpolation process independently of a pixel position on a second image that has information within a second wavelength band.

17. An image processing method comprising:

performing, using a computer, an interpolation process on each pixel of an image that includes a first color signal, a second color signal, and a third color signal, the interpolation process interpolating a missing color signal among the first color signal, the second color signal, and the third color signal, by performing a space-variant interpolation process that implements an interpolation process depending on a pixel position on a first image that has information within a first wavelength band and by performing a space-invariant interpolation process that implements an interpolation process independently of a pixel position on a second image that has information within a second wavelength band; and outputting an output image based on an image obtained by the interpolation process.

* * * * *